United States Patent
Bailey

(10) Patent No.: US 10,152,082 B2
(45) Date of Patent: Dec. 11, 2018

(54) SYSTEMS, ARTICLES AND METHODS FOR WEARABLE ELECTRONIC DEVICES THAT ACCOMMODATE DIFFERENT USER FORMS

(71) Applicant: Thalmic Labs Inc., Kitchener (CA)

(72) Inventor: Matthew Bailey, Kitchener (CA)

(73) Assignee: NORTH INC., Kitchener ( * ) Notice: Subject to any disclaimer, the term of this patent is extended or adjusted under 35 U.S.C. 154(b) by 463 days.

(21) Appl. No.: 14/276,575

(22) Filed: May 13, 2014

(65) Prior Publication Data

US 2014/0334083 A1 Nov. 13, 2014

Related U.S. Application Data

(60) Provisional application No. 61/822,740, filed on May 13, 2013, provisional application No. 61/860,063, filed on Jul. 30, 2013.

(51) Int. Cl.
*G06F 1/16* (2006.01)
*G06F 3/01* (2006.01)

(52) U.S. Cl.
CPC ............ *G06F 1/163* (2013.01); *G06F 1/1656* (2013.01); *G06F 1/1692* (2013.01); *G06F 1/1694* (2013.01); *G06F 3/015* (2013.01)

(58) Field of Classification Search
CPC .......... G06F 1/163; G06F 3/015; G06F 3/017; G06F 3/014; A61B 5/681; A61B 5/6824; A61B 5/0488; A44C 5/0007; A44C 5/08; A44C 5/0084; A44C 5/02; A44C 5/04
USPC ............. 361/679.03; 345/156; 224/163, 164; 368/281, 282
See application file for complete search history.

(56) References Cited

U.S. PATENT DOCUMENTS

| | | |
|---|---|---|
| 1,411,995 A | 4/1922 | Dull |
| 3,620,208 A | 11/1971 | Higley et al. |
| 3,880,146 A | 4/1975 | Everett et al. |

(Continued)

FOREIGN PATENT DOCUMENTS

| | | |
|---|---|---|
| CN | 102246125 A | 11/2011 |
| DE | 44 12 278 A1 | 10/1995 |

(Continued)

OTHER PUBLICATIONS

Morris et al., "Emerging Input Technologies for Always-Available Mobile Interaction," Foundations and Trends in Human-Computer Interaction, vol. 4, No. 4 (2010), pp. 245-316.

(Continued)

*Primary Examiner* — Koosha Sharifi-Tafreshi
(74) *Attorney, Agent, or Firm* — Cozen O'Connor

(57) ABSTRACT

Wearable electronic devices that provide robustness against variations in user form are described. The wearable electronic devices include a set of pod structures arranged in an annular configuration having a variable circumference, with adaptive physical coupling between adjacent pairs of pod structures. Adaptive physical coupling advantageously accommodates different user sizes, forms, and movements and enhances the overall ergonomics of the wearable electronic devices. Adaptive physical coupling also maintains substantially constant and/or equal angular spacing between components of the wearable electronic devices regardless of the form of the user.

24 Claims, 11 Drawing Sheets

(56) References Cited

U.S. PATENT DOCUMENTS

| | | |
|---|---|---|
| 4,602,639 A | 7/1986 | Hoogendoorn et al. |
| 4,705,408 A | 11/1987 | Jordi |
| 4,817,064 A | 3/1989 | Milles |
| 5,003,978 A | 4/1991 | Dunseath, Jr. |
| D322,227 S | 12/1991 | Warhol |
| 5,081,852 A * | 1/1992 | Cox ............... A44C 5/0084 63/3 |
| 5,251,189 A * | 10/1993 | Thorp ............... A44C 5/0007 224/164 |
| D348,660 S | 7/1994 | Parsons |
| 5,445,869 A | 8/1995 | Ishikawa et al. |
| 5,482,051 A | 1/1996 | Reddy |
| 5,605,059 A * | 2/1997 | Woodward ........ A44C 5/0084 63/15.7 |
| 5,683,404 A | 11/1997 | Johnson |
| 6,032,530 A | 3/2000 | Hock |
| 6,184,847 B1 | 2/2001 | Fateh et al. |
| 6,238,338 B1 | 5/2001 | DeLuca et al. |
| 6,244,873 B1 | 6/2001 | Hill |
| 6,377,277 B1 | 4/2002 | Yamamoto |
| D459,352 S | 6/2002 | Giovanniello |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,720,984 B1 | 4/2004 | Jorgensen |
| 6,743,982 B2 | 6/2004 | Biegelsen et al. |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,927,343 B2 | 8/2005 | Watanabe et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka |
| 7,450,107 B2 | 11/2008 | Radley-Smith |
| 7,491,892 B2 | 2/2009 | Wagner et al. |
| 7,517,725 B2 | 4/2009 | Reis |
| 7,558,622 B2 | 7/2009 | Tran |
| 7,596,393 B2 | 9/2009 | Jung |
| 7,636,549 B2 | 12/2009 | Ma et al. |
| 7,640,007 B2 | 12/2009 | Chen et al. |
| 7,660,126 B2 | 2/2010 | Cho et al. |
| 7,809,435 B1 | 10/2010 | Ettare et al. |
| 7,870,211 B2 | 1/2011 | Pascal et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan |
| 8,179,604 B1 | 5/2012 | Prada Gomez et al. |
| 8,188,937 B1 | 5/2012 | Amafuji et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,355,671 B2 | 1/2013 | Kramer et al. |
| 8,389,862 B2 | 3/2013 | Arora et al. |
| 8,421,634 B2 | 4/2013 | Tan et al. |
| 8,427,977 B2 | 4/2013 | Workman et al. |
| D682,727 S | 5/2013 | Bulgari |
| 8,447,704 B2 | 5/2013 | Tan |
| 8,467,270 B2 | 6/2013 | Gossweiler, III et al. |
| 8,469,741 B2 | 6/2013 | Oster et al. |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,883,287 B2 | 11/2014 | Boyce et al. |
| 8,895,865 B2 | 11/2014 | Lenahan et al. |
| 8,912,094 B2 | 12/2014 | Koo et al. |
| 8,922,481 B1 | 12/2014 | Kauffmann et al. |
| 8,954,135 B2 | 2/2015 | Yuen et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,086,687 B2 | 7/2015 | Park et al. |
| D736,664 S | 8/2015 | Paradise et al. |
| 9,146,730 B2 | 9/2015 | Lazar |
| D741,855 S | 10/2015 | Park et al. |
| D742,272 S | 11/2015 | Bailey et al. |
| D742,874 S | 11/2015 | Cheng et al. |
| D743,963 S | 11/2015 | Osterhout |
| 9,211,417 B2 | 12/2015 | Heldman et al. |
| D747,714 S | 1/2016 | Erbeus |
| D750,623 S | 3/2016 | Park et al. |
| D751,065 S | 3/2016 | Magi |
| 9,299,248 B2 | 3/2016 | Lake et al. |
| D756,359 S | 5/2016 | Bailey et al. |
| 9,367,139 B2 | 6/2016 | Ataee et al. |
| 9,372,535 B2 | 6/2016 | Bailey et al. |
| 9,393,418 B2 | 7/2016 | Giuffrida et al. |
| 9,418,927 B2 | 8/2016 | Axisa et al. |
| 9,439,566 B2 | 9/2016 | Arne et al. |
| 9,472,956 B2 | 10/2016 | Michaelis et al. |
| 9,477,313 B2 | 10/2016 | Mistry et al. |
| 9,529,434 B2 | 12/2016 | Choi et al. |
| 2002/0032386 A1 | 3/2002 | Sackner |
| 2002/0077534 A1 | 6/2002 | DuRousseau |
| 2003/0030595 A1 * | 2/2003 | Radley-Smith ...... A44C 5/0007 345/1.3 |
| 2003/0036691 A1 | 2/2003 | Stanaland et al. |
| 2003/0051505 A1 * | 3/2003 | Robertson ............ A44C 11/002 63/3.2 |
| 2003/0144586 A1 | 7/2003 | Tsubata |
| 2004/0073104 A1 | 4/2004 | Brun del Re et al. |
| 2004/0194500 A1 | 10/2004 | Rapport |
| 2004/0210165 A1 | 10/2004 | Marmaropoulos |
| 2005/0005637 A1 * | 1/2005 | Rapport ............... A44C 5/003 63/1.14 |
| 2005/0012715 A1 | 1/2005 | Ford |
| 2005/0070227 A1 | 3/2005 | Shen et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0061544 A1 | 3/2006 | Min et al. |
| 2006/0121958 A1 * | 6/2006 | Jung ..................... G06F 3/015 455/575.1 |
| 2007/0132785 A1 | 6/2007 | Ebersole, Jr. et al. |
| 2007/0279852 A1 * | 12/2007 | Daniel ................. A44C 5/0007 361/679.03 |
| 2008/0032638 A1 * | 2/2008 | Anderson ............. H04B 1/385 455/90.3 |
| 2008/0136775 A1 | 6/2008 | Conant |
| 2009/0007597 A1 | 1/2009 | Hanevold |
| 2009/0031757 A1 | 2/2009 | Harding |
| 2009/0040016 A1 | 2/2009 | Ikeda |
| 2009/0051544 A1 | 2/2009 | Niknejad |
| 2009/0102580 A1 | 4/2009 | Uchaykin |
| 2009/0109241 A1 | 4/2009 | Tsujimoto |
| 2009/0147004 A1 | 6/2009 | Ramon et al. |
| 2009/0179824 A1 | 7/2009 | Tsujimoto et al. |
| 2009/0189867 A1 | 7/2009 | Krah et al. |
| 2009/0251407 A1 | 10/2009 | Flake et al. |

(56) References Cited

U.S. PATENT DOCUMENTS

| | | | |
|---|---|---|---|
| 2009/0258669 A1 | 10/2009 | Nie et al. | |
| 2009/0318785 A1 | 12/2009 | Ishikawa et al. | |
| 2009/0327171 A1* | 12/2009 | Tan | G06F 3/015 706/12 |
| 2010/0041974 A1 | 2/2010 | Ting et al. | |
| 2010/0280628 A1 | 11/2010 | Sankai | |
| 2010/0293115 A1 | 11/2010 | Momen | |
| 2010/0317958 A1 | 12/2010 | Beck et al. | |
| 2011/0018754 A1 | 1/2011 | Tojima et al. | |
| 2011/0072510 A1 | 3/2011 | Cheswick | |
| 2011/0134026 A1 | 6/2011 | Kang et al. | |
| 2011/0166434 A1 | 7/2011 | Gargiulo | |
| 2011/0172503 A1 | 7/2011 | Knepper et al. | |
| 2011/0181527 A1 | 7/2011 | Capela et al. | |
| 2011/0213278 A1 | 9/2011 | Horak et al. | |
| 2011/0224556 A1 | 9/2011 | Moon et al. | |
| 2011/0224564 A1 | 9/2011 | Moon et al. | |
| 2012/0029322 A1 | 2/2012 | Wartena et al. | |
| 2012/0051005 A1 | 3/2012 | Vanfleteren et al. | |
| 2012/0053439 A1 | 3/2012 | Ylostalo et al. | |
| 2012/0101357 A1 | 4/2012 | Hoskuldsson et al. | |
| 2012/0157789 A1 | 6/2012 | Kangas et al. | |
| 2012/0165695 A1 | 6/2012 | Kidmose et al. | |
| 2012/0182309 A1 | 7/2012 | Griffin et al. | |
| 2012/0188158 A1 | 7/2012 | Tan et al. | |
| 2012/0203076 A1* | 8/2012 | Fatta | A61B 5/681 600/300 |
| 2012/0209134 A1 | 8/2012 | Morita et al. | |
| 2012/0226130 A1 | 9/2012 | De Graff et al. | |
| 2012/0265090 A1 | 10/2012 | Fink et al. | |
| 2012/0293548 A1 | 11/2012 | Perez et al. | |
| 2012/0302858 A1 | 11/2012 | Kidmose et al. | |
| 2012/0323521 A1 | 12/2012 | De Foras et al. | |
| 2013/0005303 A1 | 1/2013 | Song et al. | |
| 2013/0020948 A1 | 1/2013 | Han et al. | |
| 2013/0027341 A1 | 1/2013 | Mastandrea | |
| 2013/0080794 A1 | 3/2013 | Hsieh | |
| 2013/0127708 A1 | 5/2013 | Jung et al. | |
| 2013/0165813 A1 | 6/2013 | Chang et al. | |
| 2013/0191741 A1 | 7/2013 | Dickinson et al. | |
| 2013/0198694 A1 | 8/2013 | Rahman et al. | |
| 2013/0265229 A1 | 10/2013 | Forutanpour et al. | |
| 2013/0265437 A1 | 10/2013 | Thörn et al. | |
| 2013/0271292 A1 | 10/2013 | McDermott | |
| 2013/0312256 A1 | 11/2013 | Wesselmann et al. | |
| 2013/0317648 A1 | 11/2013 | Assad | |
| 2013/0332196 A1 | 12/2013 | Pinsker | |
| 2014/0020945 A1 | 1/2014 | Hurwitz et al. | |
| 2014/0028539 A1 | 1/2014 | Newham et al. | |
| 2014/0028546 A1 | 1/2014 | Jeon et al. | |
| 2014/0045547 A1 | 2/2014 | Singamsetty et al. | |
| 2014/0049417 A1 | 2/2014 | Abdurrahman et al. | |
| 2014/0094675 A1 | 4/2014 | Luna et al. | |
| 2014/0121471 A1 | 5/2014 | Walker | |
| 2014/0122958 A1 | 5/2014 | Greenebrg et al. | |
| 2014/0194062 A1 | 7/2014 | Palin et al. | |
| 2014/0198034 A1 | 7/2014 | Bailey et al. | |
| 2014/0198035 A1 | 7/2014 | Bailey et al. | |
| 2014/0236031 A1 | 8/2014 | Banet et al. | |
| 2014/0240103 A1 | 8/2014 | Lake et al. | |
| 2014/0249397 A1 | 9/2014 | Lake et al. | |
| 2014/0257141 A1 | 9/2014 | Giuffrida et al. | |
| 2014/0285326 A1 | 9/2014 | Luna et al. | |
| 2014/0299362 A1 | 10/2014 | Park et al. | |
| 2014/0334653 A1 | 11/2014 | Luna et al. | |
| 2014/0337861 A1 | 11/2014 | Chang et al. | |
| 2014/0340857 A1 | 11/2014 | Hsu et al. | |
| 2014/0349257 A1 | 11/2014 | Connor | |
| 2014/0354528 A1 | 12/2014 | Laughlin et al. | |
| 2014/0354529 A1 | 12/2014 | Laughlin et al. | |
| 2014/0364703 A1* | 12/2014 | Kim | A61B 5/0492 600/301 |
| 2014/0375465 A1 | 12/2014 | Fenuccio et al. | |
| 2015/0011857 A1 | 1/2015 | Henson et al. | |
| 2015/0025355 A1 | 1/2015 | Bailey et al. | |
| 2015/0051470 A1 | 2/2015 | Bailey et al. | |
| 2015/0057506 A1 | 2/2015 | Luna et al. | |
| 2015/0057770 A1 | 2/2015 | Bailey et al. | |
| 2015/0065840 A1 | 3/2015 | Bailey | |
| 2015/0084860 A1 | 3/2015 | Aleem et al. | |
| 2015/0106052 A1 | 4/2015 | Balakrishnan et al. | |
| 2015/0109202 A1 | 4/2015 | Ataee et al. | |
| 2015/0124566 A1 | 5/2015 | Lake et al. | |
| 2015/0141784 A1 | 5/2015 | Morun et al. | |
| 2015/0148641 A1 | 5/2015 | Morun et al. | |
| 2015/0160621 A1 | 6/2015 | Yilmaz | |
| 2015/0182113 A1 | 7/2015 | Utter, II | |
| 2015/0182130 A1 | 7/2015 | Utter, II | |
| 2015/0182163 A1 | 7/2015 | Utter | |
| 2015/0182164 A1 | 7/2015 | Utter, II | |
| 2015/0185838 A1 | 7/2015 | Camacho-Perez et al. | |
| 2015/0186609 A1 | 7/2015 | Utter, II | |
| 2015/0216475 A1 | 8/2015 | Luna et al. | |
| 2015/0230756 A1 | 8/2015 | Luna et al. | |
| 2015/0234426 A1 | 8/2015 | Bailey et al. | |
| 2015/0237716 A1 | 8/2015 | Su et al. | |
| 2015/0261306 A1 | 9/2015 | Lake | |
| 2015/0277575 A1 | 10/2015 | Ataee et al. | |
| 2015/0296553 A1 | 10/2015 | DiFranco et al. | |
| 2015/0325202 A1 | 11/2015 | Lake et al. | |
| 2015/0370333 A1 | 12/2015 | Ataee et al. | |
| 2016/0020500 A1 | 1/2016 | Matsuda | |
| 2016/0150636 A1 | 5/2016 | Otsubo | |
| 2016/0156762 A1 | 6/2016 | Bailey et al. | |
| 2016/0199699 A1 | 7/2016 | Klassen | |
| 2016/0202081 A1 | 7/2016 | Debieuvre et al. | |
| 2016/0274758 A1 | 9/2016 | Bailey | |
| 2016/0309249 A1 | 10/2016 | Wu et al. | |
| 2016/0313899 A1 | 10/2016 | Noel | |

FOREIGN PATENT DOCUMENTS

| | | |
|---|---|---|
| EP | 0301790 A2 | 2/1989 |
| JP | 2009-50679 A | 3/2009 |
| KR | 10-2012-0094870 A | 8/2012 |
| KR | 10-2012-0097997 A | 9/2012 |
| WO | 2011070554 A2 | 6/2011 |

OTHER PUBLICATIONS

Costanza et al., "EMG as a Subtle Input Interface for Mobile Computing," MobileHCI 2004, LNCS 3160, edited by S. Brewster and M. Dunlop, pp. 426-430, 2004, Springer-Verlag Berlin Heidelberg.

Costanza et al., "Toward Subtle Intimate Interfaces for Mobile Devices Using an EMG Controller," CHI 2005, Proceedings of the SIGCHI Conference on Human Factors in Computing Systems, p. 481-489.

Rekimoto, Jun, "GestureWrist and GesturePad: Unobtrusive Wearable Interaction Devices," ISWC '01 Proceedings of the 5th IEEE International Symposium on Wearable Computers, p. 21-27.

Zhang et al., "A Framework for Hand Gesture Recognition Based on Accelerometer and EMG Sensors," IEEE Transactions on Systems, Man, and Cybernetics—Part A: Systems and Humans, vol. 41, No. 6, Nov. 2011, 13 pages.

Ghasemzadeh et al., "A Body Sensor Network with Electromyogram and Inertial Sensors: Multimodal Interpretation of Muscular Activities," IEEE Transactions on Information Technology in Biomedicine, vol. 14, No. 2, Mar. 2010, p. 198-206.

Xiong et al., "A Novel HCI based on EMG and IMU," Proceedings of the 2011 IEEE International Conference on Robotics and Biometrics, Dec. 7-11, 2011, Phuket, Thailand, p. 2653-2657.

Naik et al., "Real-Time Hand Gesture Identification for Human Computer Interaction Based on ICA of Surface Electromyogram," IADIS International Conference Interfaces and Human Computer Interaction 2007, p. 83-90.

Saponas et al., "Making Muscle-Computer Interfaces More Practical," CHI 2010, Apr. 10-15, 2010, Atlanta, Georgia, USA, 4 pages.

Picard et al., "Affective Wearables," Proceedings of the IEEE 1st International Symposium on Wearable Computers, ISWC, Cambridge, MA USA, Oct. 13-14, pp. 91-97 (1997).

(56) References Cited

OTHER PUBLICATIONS

International Search Report, dated May 16, 2014, for PCT/US2014/017799, 11 pages.
International Search Report, dated Aug. 21, 2014, for PCT/US2014/037863, 12 pages.
Gourmelon et al., "Contactless sensors for Surface Electromyography," Proceedings of the 28th IEEE EMBS Annual International Conference, New York City, NY, Aug. 30-Sep. 3, 2006, 2514-2517.
International Search Report and Written Opinion, dated Nov. 21, 2014, for International Application No. PCT/US2014/052143, 11 pages.
International Search Report and Written Opinion, dated Feb. 27, 2015, for International Application No. PCT/US2014/067443, 13 pages.
International Search Report and Written Opinion, dated May 27, 2015, for International Application No. PCT/US2015/015675, 9 pages.
Sato et al., "Touché: Enhancing Touch Interaction on Humans, Screens, Liquids, and Everyday Objects," CHI' 12, May 5-10, 2012, Austin, Texas, 483-492.
Ueno et al., "A Capacitive Sensor System for Measuring Laplacian Electromyogram through Cloth: A Pilot Study," Proceedings of the 29th Annual International Conference of the IEEE EMBS, Cité Internationale, Lyon, France, Aug. 23-26, 2007, 5731-5734.
Ueno et al., "Feasibility of Capacitive Sensing of Surface Electromyographic Potential through Cloth," *Sensors and Materials* 24(6):335-346, 2012.
Xu et al., "Hand Gesture Recognition and Virtual Game Control Based on 3D Accelerometer and EMG Sensors," Proceedings of the 14th international conference on Intelligent user interfaces, Sanibel Island, Florida, Feb. 8-11, 2009, pp. 401-406.
Communication pursuant to Rule 164(1) EPC, dated Sep. 30, 2016, for corresponding EP Application No. 14753949.8, 7 pages.
Brownlee, "Finite State Machines (FSM): Finite state machines as a control technique in Artificial Intelligence (AI)," Jun. 2002, 12 pages.
Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.
Merriam-Webster, "Radio Frequencies" retrieved from https://www.merriam-webster.com/table/collegiate/radiofre.htm, retrieved on Jul. 12, 2017, 2 pages.

\* cited by examiner

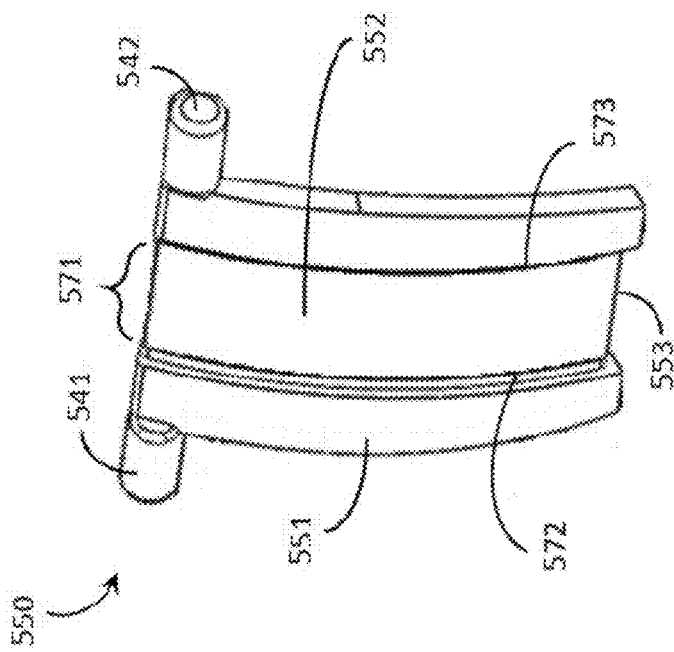
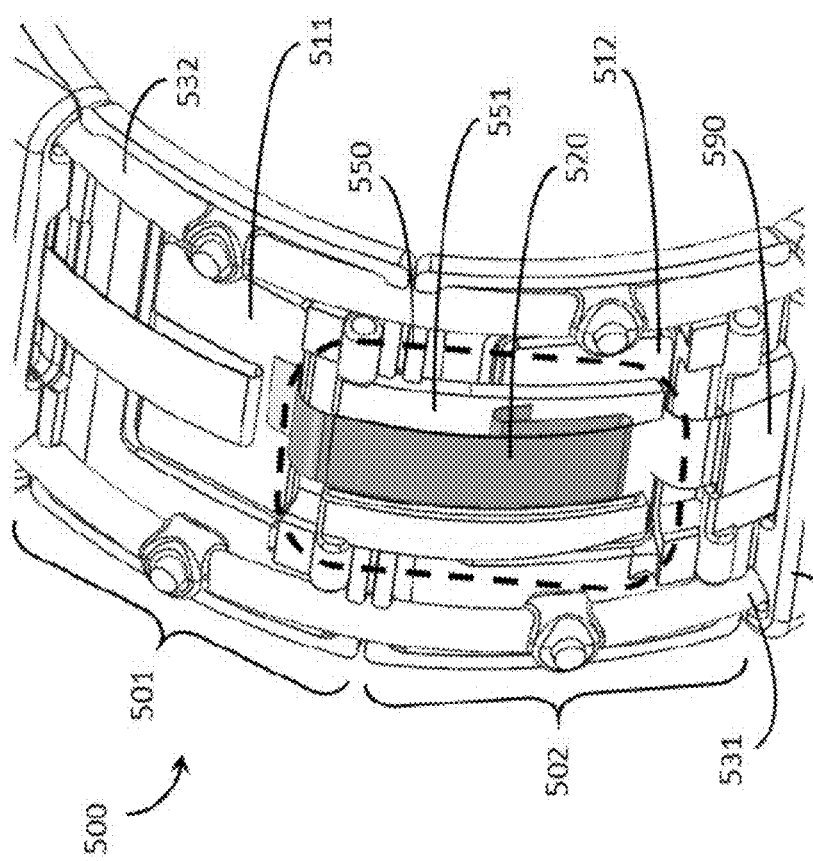

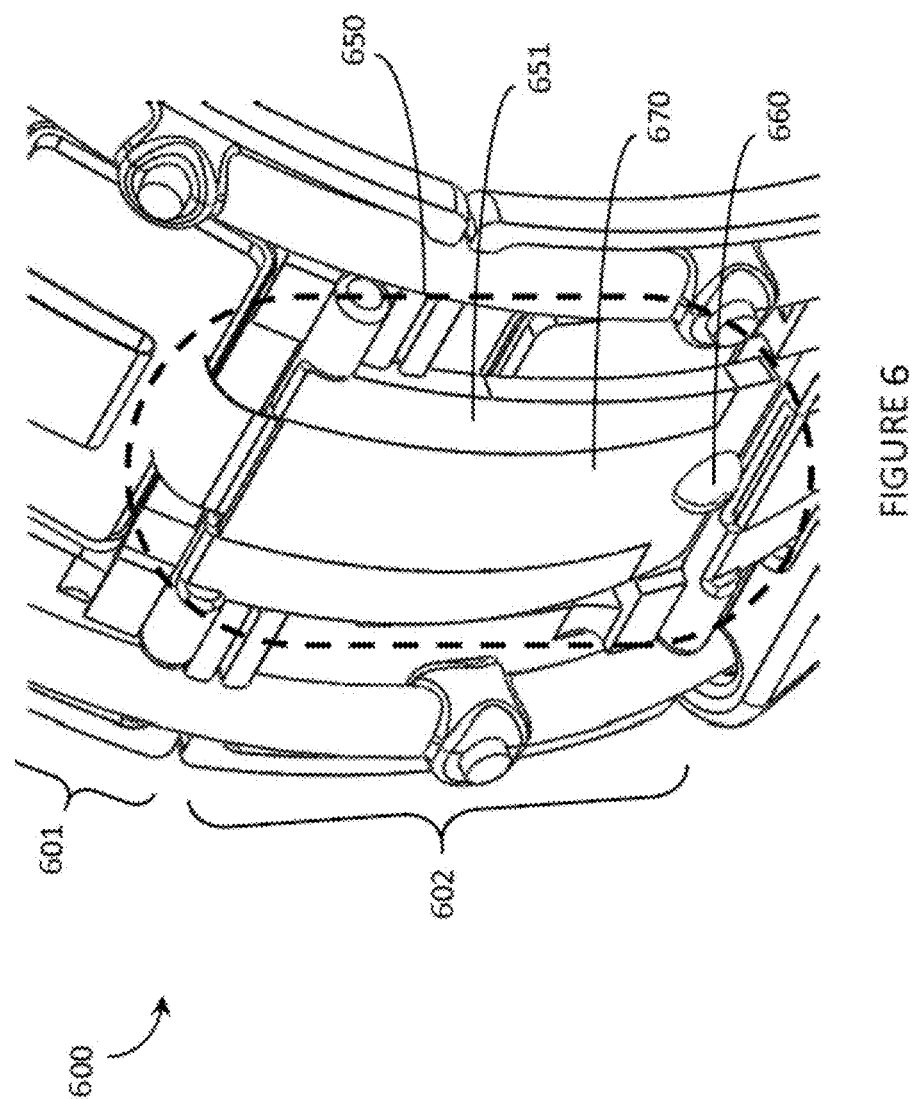

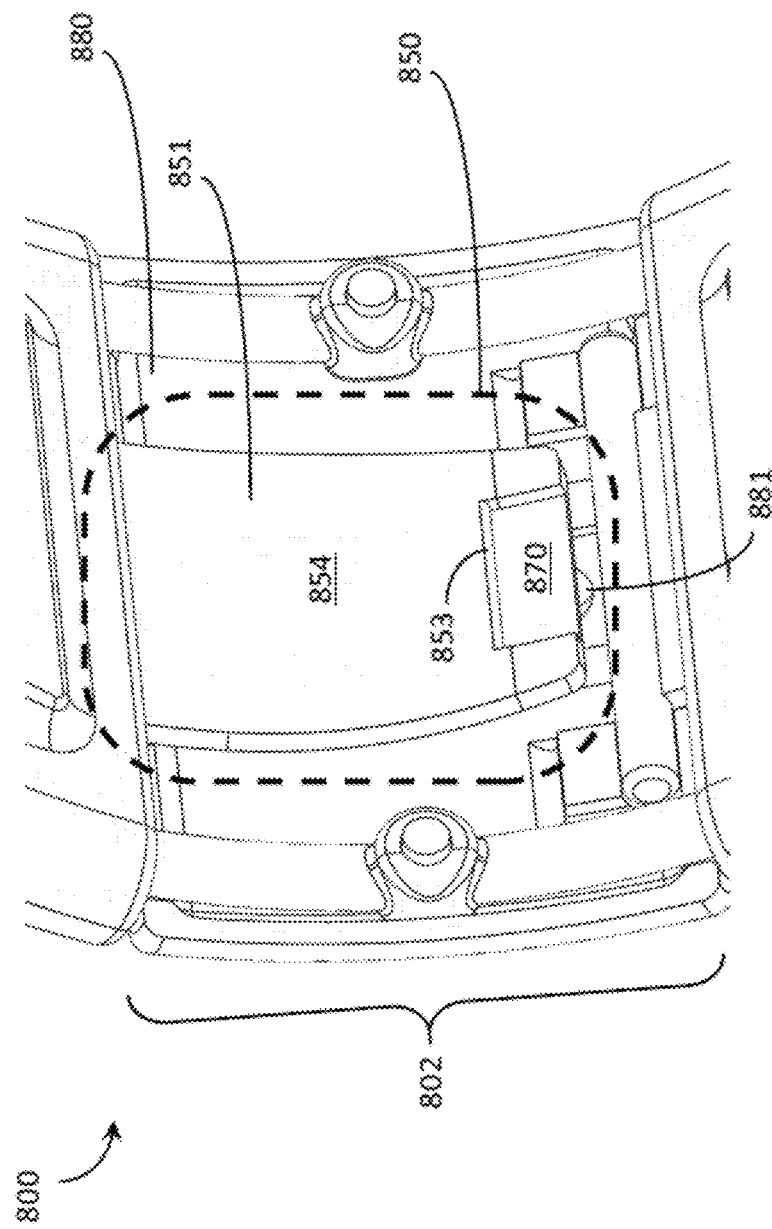

SYSTEMS, ARTICLES AND METHODS FOR WEARABLE ELECTRONIC DEVICES THAT ACCOMMODATE DIFFERENT USER FORMS

BACKGROUND

Technical Field

The present systems, articles and methods generally relate to wearable electronic devices and particularly relate to systems, articles and methods that enable a wearable electronic device to accommodate a wide range of user forms.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems; however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hand(s). For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

The potential users of a wearable electronic device may come in many different shapes and sizes. To address this, either a unique wearable electronic device must be designed and built (i.e., customized) for each individual user, or an individual device must be able to accommodate a variety of different user forms. For some devices this is simply a matter of comfort for the user, whereas for other devices the operation/performance is affected by the fit between the device and the user. For example, the operation/performance of a wearable electronic device that employs sensors to detect inputs from a user may be influenced by the relative positions of the sensors on the user's form. In this case, the same wearable electronic device may operate/perform differently when worn by two different users, or even when worn in different ways by the same user. Such operation/performance inconsistencies can result in a poor user experience and are clearly undesirable. It is impractical to design and build a customized wearable electronic device for each user, thus there is a need in the art for wearable electronic devices with improved robustness against variations in user form.

Human-Electronics Interfaces

A wearable electronic device may provide direct functionality for a user (such as audio playback, data display, computing functions, etc.) or it may provide electronics to interact with, receive information from, and/or control another electronic device. For example, a wearable electronic device may include sensors that detect inputs from a user and transmit signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gesture control, and/or accelerometers providing gesture control.

A human-computer interface ("HCI") is an example of a human-electronics interface. The present systems, articles, and methods may be applied to wearable human-computer interfaces, but may also be applied to any other form of wearable human-electronics interface.

Muscle Interface Devices

Muscle interface devices are wearable electronic devices. Conventionally, in the research and medical fields, electromyography ("EMG") electrodes are manually positioned directly above the muscles of interest by a trained health care professional. This ensures that the sensors are properly located on a patient in order to obtain the desired signals. In order for muscle interface devices to be commercially viable as consumer devices, the sensors must be positioned in a standardized fashion across a broad range of users who will be using the device. Furthermore, to be commercially viable as consumer devices, muscle interface devices cannot be designed to require the assistance of a trained professional in order to properly position the sensors each time the device is worn.

Thus, there is a need in the art for an improved muscle interface device which overcomes at least some of these limitations.

BRIEF SUMMARY

An annular wearable electronic device having a variable circumference may be summarized as including a first pod structure positioned at least approximately on the circumference, wherein the first pod structure includes a first sensor to detect an input from a user; a second pod structure positioned at least approximately on the circumference, wherein the second pod structure includes a second sensor to detect an input from the user, and wherein the first and the second sensors are physically spaced apart from one another by a circumferential spacing C and by an angular spacing θ; and at least one adaptive coupler that physically couples the first pod structure and the second pod structure, wherein a length of the at least one adaptive coupler is variable such that the circumferential spacing C between the first and second sensors is variable, and wherein the angular spacing θ between the first and the second sensors is at least approximately constant regardless of the length of the at least one adaptive coupler. At least one of the first sensor and the second sensor may be selected from the group consisting of: an electromyography sensor; a magnetomyography sensor; a mechanomyography sensor; a blood pressure sensor; a heart rate sensor; an accelerometer; a gyroscope; a compass; and a thermometer. The first pod structure may include electrical circuitry and the second pod structure may include electrical circuitry, and at least one of the first pod structure and the second pod structure may include at least one component selected from the group consisting of: an amplification circuit, an analog-to-digital conversion circuit, a battery, a wireless transmitter, and a connector port. The annular wearable electronic device may further include at least one electrical coupling between the electrical circuitry of the first pod structure and the electrical circuitry of the second pod structure. The at least one adaptive coupler may include at least one elastic band.

The annular wearable electronic device may further include a third pod structure positioned at least approximately on the circumference, where the at least one adaptive coupler provides a physical adaptive coupling between the second pod structure and the third pod structure such the physical adaptive coupling between the second pod structure and the third pod structure has a variable length. The at least one adaptive coupler may include a single adaptive coupler that provides physical adaptive coupling both between the first pod structure and the second pod structure and between the second pod structure and the third pod structure. The at least one adaptive coupler may include a first adaptive coupler that provides physical adaptive coupling between the first pod structure and the second pod structure and a second adaptive coupler that provides physical adaptive coupling between the second pod structure and the third pod structure. The third pod structure may include a third sensor to detect an input from the user, the second and third sensors physically spaced apart from one another by the circumferential spacing C and by the angular spacing $\theta$, and the circumferential spacing C between the second and the third sensors may be variable and the angular spacing $\theta$ between the second and the third sensors may be at least approximately constant regardless of the length of the physical adaptive coupling between the second pod structure and the third pod structure. The angular spacing $\theta$ between the second and the third sensors may be at least approximately equal to the angular spacing $\theta$ between the first and the second sensors.

The annular wearable electronic device may further include at least one additional pod structure positioned at least approximately on the circumference, wherein each one of the first pod structure, the second pod structure, the third pod structure, and the at least one additional pod structure is positioned adjacent two other ones of the first pod structure, the second pod structure, the third pod structure, and the at least one additional pod structure, and wherein the at least one adaptive coupler provides a respective physical adaptive coupling between each pair of adjacent pod structures such that the physical coupling between each pair of adjacent pod structures has a variable length. Each additional pod structure may include a respective sensor to detect an input from the user, the respective sensors in each pair of adjacent pod structures physically spaced apart from one another by the circumferential spacing C and by the angular spacing $\theta$, and the circumferential spacing C between the respective sensors in each pair of adjacent pod structures may be variable and the angular spacing $\theta$ between the respective sensors in each pair of adjacent pod structures may be at least approximately constant regardless of the length of the physical adaptive coupling between the each pair of adjacent pod structures. The angular spacing $\theta$ between the respective sensors in each pair of adjacent pod structures may be at least approximately equal.

A wearable electronic device may be summarized as including a set of pod structures arranged in an annular configuration having a variable circumference, wherein each pod structure in the set of pod structures is positioned adjacent two other pod structures in the set of pod structures at least approximately on the circumference, and wherein a first pod structure in the set of pod structures includes a first sensor to detect an input from a user and a second pod structure in the set of pod structures includes a second sensor to detect an input from the user, the first and the second sensors physically spaced apart from one another in the annular configuration by a circumferential spacing C and an angular spacing $\theta$; and at least one adaptive coupler that physically couples each pod structure in the set of pod structures to two adjacent pod structures in the set of pod structures such that the at least one adaptive coupler physically binds the set of pod structures in the annular configuration, wherein a length of the at least one adaptive coupler is variable such that the circumferential spacing C between the first and the second sensors is variable, and wherein the angular spacing $\theta$ between the first and the second sensors is at least approximately constant regardless of the length of the at least one adaptive coupler. Each pod structure in the set of pod structures may include a respective sensor to detect an input from the user. The circumferential spacing C may be at least approximately equal between the respective sensors of each pair of adjacent pod structures. The angular spacing $\theta$ may be at least approximately equal between the respective sensors of each pair of adjacent pod structures, and the angular spacing $\theta$ between the respective sensors of each pair of adjacent pod structures may be at least approximately constant regardless of the length of the at least one adaptive coupler. The set of pod structures may include at least two pod structures. The set of pod structures may include at least eight pod structures.

At least one of the first sensor and the second sensor may be selected from the group consisting of: an electromyography sensor; a magnetomyography sensor; a mechanomyography sensor; a blood pressure sensor; a heart rate sensor; an accelerometer; a gyroscope; a compass; and a thermometer. Each pod structure in the set of pod structures may include respective electrical circuitry, and at least one pod structure in the set of pod structures may include a component selected from the group consisting of: an amplification circuit, an analog-to-digital conversion circuit, a battery, a wireless transmitter, and a connector port. The annular wearable electronic device may further include at least one electrical coupling between the electrical circuitry of the first pod structure and the electrical circuitry of the second pod structure. The annular wearable electronic device may further include a respective electrical coupling between the respective electrical circuitries of each pair of adjacent pod structures in the set of pod structures. The at least one adaptive coupler may include at least one elastic band. The at least one adaptive coupler may include a single adaptive coupler that provides physical coupling between each pair of adjacent pod structures in the set of pod structures., or the at least one adaptive coupler may include a set of adaptive couplers, where each adaptive coupler in the set of adaptive couplers provides physical adaptive coupling between a respective pair of adjacent pod structures in the set of pod structures.

The present disclosure relates to human-computer interface devices, and more specifically to a wearable muscle interface device based human-computer interface (HCI).

A wearable muscle interface device may be configured to be worn on the forearm of the user, and may include a plurality of pods arranged in spaced apart relation around a resiliently expandable band. For example, the pods may be spaced apart equidistant to each other, although in some cases the space between different pods may vary.

Each pod may contain one or more sensors, such as an electromyography (EMG) sensor, a mechanomyography (MMG) sensor, or an inertial measurement unit (IMU). When the muscle interface device is worn, the resiliently expandable band may stretch over a portion of a limb, such as the forearm of a user.

A muscle interface device may be adapted to be worn on a user's forearm closer to the elbow than the wrist. This allows a plurality of sensors to be positioned over and around the largest circumference of the forearm to ensure that the sensors are able to pick up the strongest electrical signals from the largest muscle masses in the forearm.

As the circumference of the forearm is greater near the elbow than near the wrist, and the surface of the skin tapers as it approaches the hand, the wearable muscle interface device may be generally configured to allow a frusto-conical shape to be assumed to conform to the taper of the forearm of various users.

Conveniently, the resiliently expandable band of the muscle interface device may allow the device to be worn by users having differently sized forearms. Furthermore, by allowing the resiliently expandable band to be stretched substantially uniformly, the resiliently expandable band may also ensure that the relative spaced apart positions of the sensors around a forearm are maintained from user to user within a defined range.

Advantageously, the present systems, articles, and methods do not require that the sensors be placed in exactly the same position every time the user puts the device on. Rather, the present systems, articles, and method provide the ability to maintain the relative positions of the sensors from user to user allowing the wearable muscle interface device to be pre-calibrated for different users as the pattern of signals around the circumference of the users' forearms is generally maintained.

Other features and advantages of the present systems, articles, and methods will become apparent from the following detailed description and accompanying drawings. It should be understood, however, that the detailed description and specific examples are given by way of illustration and not limitation. Many modifications and changes within the scope of the present systems, articles, and methods may be made without departing from the spirit thereof, and the present systems, articles, and methods include all such modifications.

A wearable muscle interface device configured to be worn on the forearm of a user may be summarized as comprising: a resiliently expandable band; and a plurality of pods arranged around the resiliently expandable band, whereby the plurality of pods maintain a relative position around a circumference of the forearm of a user. The pods may be spaced apart and expandable in a relative relation to each other. The pods may be spaced apart in equal relation to each other. Each pod may contain one or more sensors, including one or more electromyography (EMG) sensor, a mechanomyography (MMG) sensor, and/or an inertial measurement unit (IMU). The resiliently expandable band may be stretchable around the largest forearm muscle mass of users. The resiliently flexible band may be generally a frusto-conical shape conforming to the taper of a forearm.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 5A is a perspective view of a portion of an exemplary wearable electronic device with a built-in strain mitigation system for mitigating physical strain on an internal wiring component in accordance with the present systems, articles and methods.

FIG. 5B is a perspective view of the strain mitigation system of the exemplary wearable electronic device from FIG. 5A with the other components from FIG. 5A removed to reduce clutter.

FIG. 6 is a perspective view of a portion of an exemplary wearable electronic device including two adjacent electronic circuit structures and a strain mitigation system, with one electronic circuit structure slideably coupled to the strain mitigation system in accordance with the present systems, articles and methods.

FIG. 8 is a perspective view of a portion of an exemplary wearable electronic device including an electronic circuit structure and a guide structure slideably coupled to the electronic circuit structure in accordance with the present systems, articles and methods.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, articles, and methods for wearable electronic devices that accommodate different user forms. In particular, wearable electronic devices that employ sensors to detect inputs from a user (such as muscle interface devices) incorporate the present systems, articles, and methods to improve operation/performance robustness against variations in user form.

Throughout this specification and the appended claims, the term "form" as in "user form" is used to generally describe the physical properties of the portion of a user upon which a wearable electronic device is worn. The physical properties may include any characteristic that can influence the operation/performance of the wearable electronic device, including but not limited to: shape, size, geometry, topography, mass, volume, density, composition, elasticity, etc.

Figure 1:
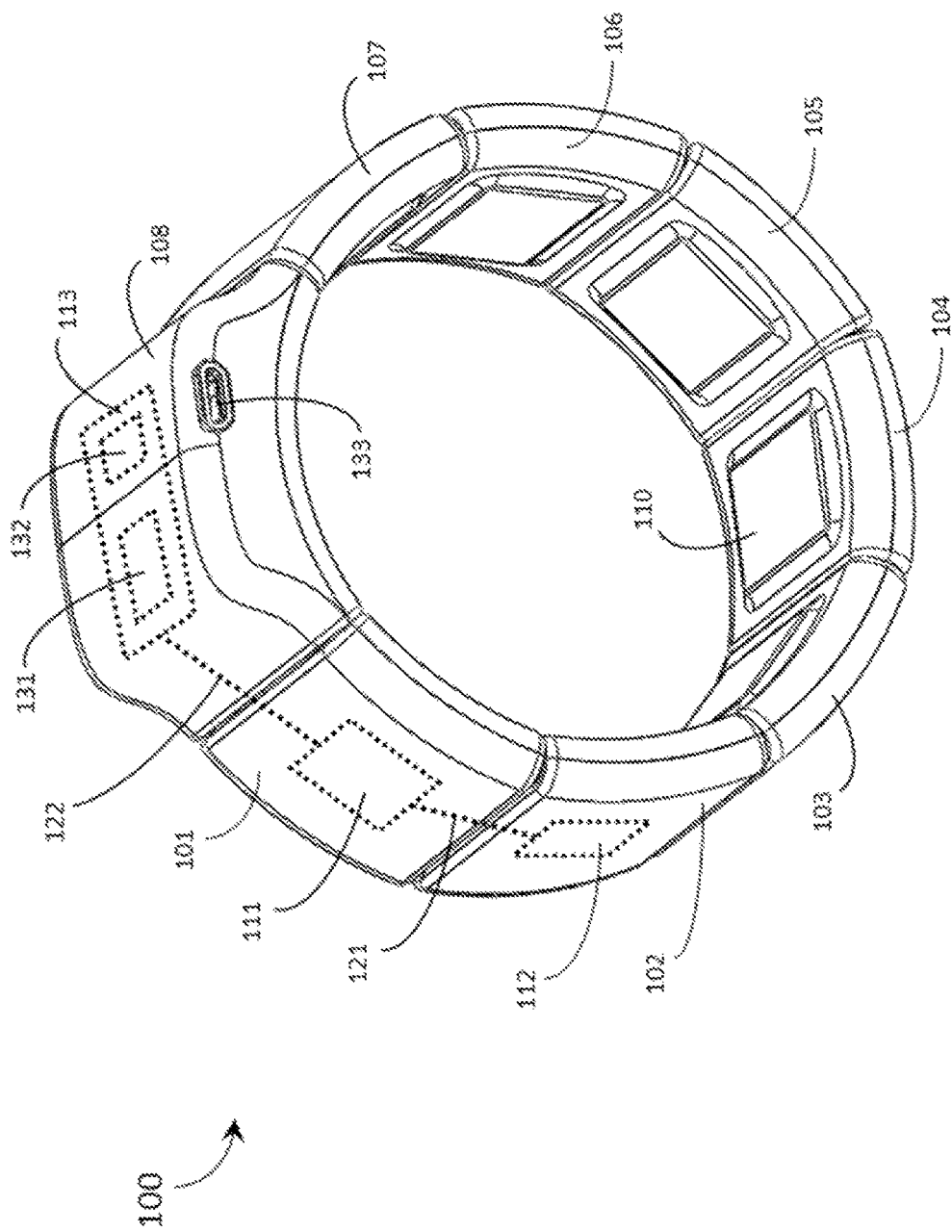
FIG. 1 is a perspective view of an exemplary wearable electronic device that is designed to accommodate a variety of different user forms in accordance with the present systems, articles and methods.

FIG. 1 is a perspective view of an exemplary wearable electronic device 100 that is designed to accommodate a variety of different user forms in accordance with the present systems, articles and methods. Exemplary device 100 is an armband designed to be worn on the wrist, forearm, or upper arm of a user, though a person of skill in the art will appreciate that the teachings described herein may readily be applied in wearable electronic devices designed to be worn elsewhere on the body of the user (including without limitation on the leg, ankle, torso, finger, or neck of the user). Device 100 includes a set of eight pod structures 101, 102, 103, 104, 105, 106, 107, and 108 arranged in an annular configuration having a variable circumference or perimeter such that each pod structure in the set of eight pod structures is positioned adjacent (e.g., in between) two other pod structures in the set of eight pod structures at least approximately on the circumference or perimeter of the annular configuration. For example, pod structure 101 is positioned adjacent (i.e., in between) pod structures 102 and 108 at least approximately on the circumference or perimeter of the annular configuration, pod structure 102 is positioned adjacent pod structures 101 and 103 at least approximately on the circumference or perimeter of the annular configuration, pod structure 103 is positioned adjacent pod structures 102 and 104 at least approximately on the circumference or perimeter of the annular configuration, and so on. Each of pod structures 101, 102, 103, 104, 105, 106, 107, and 108 is physically coupled to the two adjacent pod structures by at least one adaptive coupler (not shown in FIG. 1). For example, pod structure 101 is physically coupled to pod structure 108 by an adaptive coupler and to pod structure 102 by an adaptive coupler. The term "adaptive coupler" is used throughout this specification and the appended claims to denote a system, article or device that provides flexible, adjustable, modifiable, extendable, extensible, expandable, or otherwise "adaptable" physical coupling. Adaptive coupling is physical coupling between two objects that permits limited motion of the two objects relative to one another. An example of an adaptive coupler is an elastic material such as an elastic band. Thus, each of pod structures 101, 102, 103, 104, 105, 106, 107, and 108 in the set of eight pod structures may be physically coupled to the two adjacent pod structures by at least one elastic band. The set of eight pod structures may be physically bound in the annular configuration by a single elastic band that couples over or through all pod structures or by multiple disparate elastic bands that couple between adjacent pairs of pod structures or between groups of adjacent pairs of pod structures. Device 100 is depicted in FIG. 1 with the at least one adaptive coupler completely retracted and contained within the eight pod structures 101, 102, 103, 104, 105, 106, 107, and 108 (and therefore the at least one adaptive coupler is not visible in FIG. 1).

Throughout this specification and the appended claims, the term "pod structure" is used to refer to an individual segment, pod, section, structure, component, link, unit in a connected series of units, etc. of a wearable electronic device. For the purposes of the present systems, articles, and methods, an "individual segment, pod, section, structure, component, link, unit, etc." (i.e., a "pod structure") of a wearable electronic device is characterized by its ability to be moved or displaced relative to another segment, pod, section, structure component, link, unit, etc. of the wearable electronic device. For example, pod structures 101 and 102 of device 100 can each be moved or displaced relative to one another within the constraints imposed by the adaptive coupler providing adaptive physical coupling therebetween. The desire for pod structures 101 and 102 to be movable/displaceable relative to one another specifically arises because device 100 is a wearable electronic device that advantageously accommodates the movements of a user and/or different user forms. Device 100 includes eight pod structures 101, 102, 103, 104, 105, 106, 107, and 108. The number of pod structures included in a wearable electronic device is dependent on at least the nature, function(s), and design of the wearable electronic device, and the present systems, articles, and methods may be applied to any wearable electronic device employing any number of pod structures, including wearable electronic devices employing more than eight pod structures and wearable electronic devices employing fewer than eight pod structures.

In exemplary device 100 of FIG. 1, each of pod structures 101, 102, 103, 104, 105, 106, 107, and 108 comprises a respective housing having a respective inner volume. Each housing may be formed of substantially rigid material and may be optically opaque. Thus, details of the components contained within the housings (i.e., within the inner volumes of the housings) of pod structures 101, 102, 103, 104, 105, 106, 107, and 108 may not be visible in FIG. 1 (unless an optically transparent or translucent material is used for the housing material). To facilitate descriptions of exemplary device 100, some internal components are depicted by dashed lines in FIG. 1 to indicate that these components are not actually visible in the view depicted in FIG. 1. For example, any or all of pod structures 101, 102, 103, 104, 105, 106, 107, and/or 108 may include electrical circuitry. In FIG. 1, pod structure 101 is shown containing electrical circuitry 111, pod structure 102 is shown containing electrical circuitry 112, and pod structure 108 is shown containing electrical circuitry 113. The electrical circuitry in any or all pod structures may be electrically coupled (i.e., directly or indirectly) to the electrical circuitry in any or all other pod structures. For example, FIG. 1 shows electrical coupling 121 between electrical circuitry 111 of pod structure 101 and electrical circuitry 112 of pod structure 102 and electrical coupling 122 between electrical circuitry 111 of pod structure 101 and electrical circuitry 113 of pod structure 108. Electrical coupling between electrical circuitries of adjacent pod structures in device 100 may advantageously include systems, articles, and methods for strain mitigation as described in U.S. Provisional Patent Application Ser. No. 61/857,105, which is incorporated by reference herein in its entirety.

Throughout this specification and the appended claims, the term "rigid" as in, for example, "substantially rigid material," is used to describe a material that has an inherent tendency to maintain its shape and resist malformation/deformation under the moderate stresses and strains typically encountered by a wearable electronic device.

As previously described, a wearable electronic device may include sensors to detect input signals from a user. In exemplary device 100, each of pod structures 101, 102, 103, 104, 105, 106, 107, and 108 includes a respective sensor 110 (only one called out in FIG. 1 to reduce clutter) to detect input signals from the user. Sensor 110 may be any type of sensor that is capable of detecting a signal produced, generated, or otherwise effected by the user, including but not limited to: an electromyography sensor, a magnetomyography sensor, a mechanomyography sensor, a blood pressure sensor, a heart rate sensor, a gyroscope, an accelerometer, a compass, and/or a thermometer. In exemplary device 100, each of pod structures 101, 102, 103, 104, 105, 106, 107, and 108 includes a respective electromyography sensor 110 (only one called out in FIG. 1 to reduce clutter) to detect input signals from the user in the form of electrical signals produced by muscle activity. Exemplary device 100 is therefore a muscle interface device or "electromyography device." Electromyography device 100 may transmit information based on the detected input signals to provide a human-electronics interface (e.g., a human-computer interface). Further details of exemplary electromyography device 100 are described in U.S. Provisional Patent Application Ser. No. 61/752,226 (now U.S. Non-Provisional patent application Ser. No. 14/155,087 and U.S. Non-Provisional patent application Ser. No. 14/155,107), U.S. Provisional Patent Application Ser. No. 61/768,322 (now U.S. Non-Provisional patent application Ser. No. 14/186,878 and U.S. Non-Provisional patent application Ser. No. 14/186,889), and U.S. Provisional Patent Application Ser. No. 61/771,500 (now U.S. Non-Provisional patent application Ser. No. 14/194,252), each of which is incorporated herein by reference in its entirety. Those of skill in the art will appreciate, however, that a wearable electronic device having electromyography functionality (i.e., a muscle interface device) is used only as an example in the present systems, articles, and methods and that the systems, articles and methods for wearable electronic devices that accommodate different user forms described herein are in no way limited to wearable electronic devices that employ electromyography sensors unless explicitly recited in a respective claim to such.

The components and functions of the electrical circuitry in any or all of pod structures 101, 102, 103, 104, 105, 106, 107, and/or 108 depend on the nature of device 100. In the example of device 100 as an electromyography device, electrical circuitry 113 of pod structure 108 may include, for example, a battery 131, a wireless transmitter 132 (e.g., a Bluetooth® transmitter) with associated antenna(s), and/or a tethered connector port 133 (e.g., wired, optical). Battery 131 may be included to provide a portable power source for device 100, wireless transmitter 132 may be included to send signals to another electronic device based on the muscle activity signals detected by electromyography sensors 110, and connector port 133 may be included to provide a direct communicative (e.g., electrical, optical) coupling to another electronic device for the purpose of power transfer (e.g., recharging battery 131) and/or data transfer. Connector port 133 is illustrated in FIG. 1 as a micro-Universal Serial Bus port, though a person of skill in the art will appreciate that any connector port may similarly be used, including but not limited to: a Universal Serial Bus port, a mini-Universal Serial Bus port, a SMA port, a THUNDERBOLT® port and the like. Furthermore, the electrical circuitry in any or all of pod structures 101, 102, 103, 104, 105, 106, 107, and/or 108 may include components for processing signals from electromyography sensors 110, including but not limited to an amplification circuit to amplify signals from an electromyography sensor and/or an analog-to-digital conversion circuit to convert analog signals output by an electromyography sensor into digital signals for further processing.

Device 100 employs sensors 110 to detect inputs from the user and, as previously described, the operation/performance of device 100 may be influenced by the relative positions of sensors 110 on the user's form. To address the fact that potential users of a wearable electronic device may come in a variety of different forms, the various embodiments described herein provide systems, articles, and methods that improve the operation/performance robustness of a wearable electronic device (e.g., device 100) against variations in user form. In particular, the various embodiments described herein provide systems, articles, and methods for wearable electronic devices that achieve at least approximately equal and/or constant angular spacing between respective sensors of adjacent pod structures regardless of the form of the user wearing the device. In this way, the various embodiments described herein also enable the sensors 110 to be readily positioned in a standardized fashion (i.e., having at least approximately equal angular spacing therebetween) across a broad range of users who will be using the device.

Figure 2A:
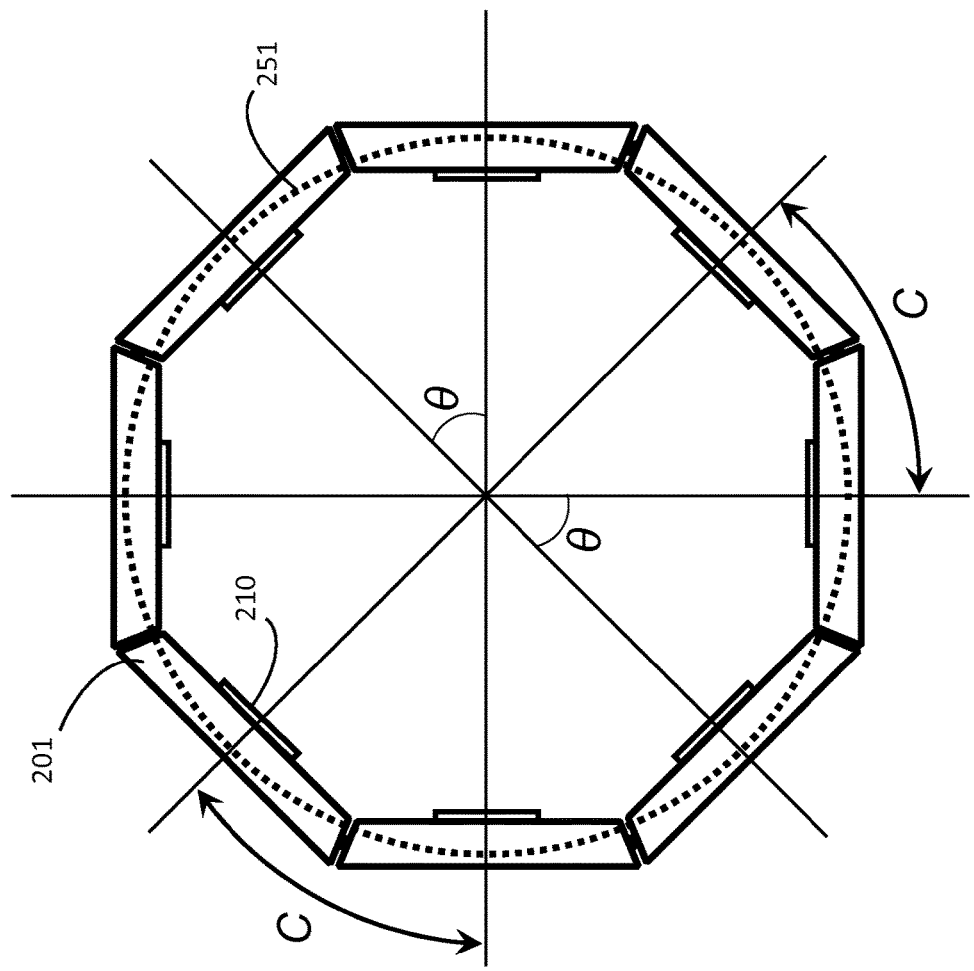
FIG. 2A is a side-elevation view of a wearable electronic device that accommodates a wide range of different user forms in accordance with the present systems, articles, and methods.

FIG. 2A is a side-elevation of a wearable electronic device 200 that accommodates a wide range of different user forms in accordance with the present systems, articles, and methods. Device 200 is substantially similar to device 100 from FIG. 1 in that device 200 includes a set of eight pod structures 201 (only one called out in FIG. 2A to reduce clutter) arranged in an annular configuration having a variable circumference or perimeter, and each pod structure 201 includes a respective sensor 210 (only one called out in FIG. 2A to reduce clutter). In the same way as described for device 100 of FIG. 1, each pod structure 201 in device 200 is physically coupled to two adjacent pod structures by at least one adaptive coupler. The at least one adaptive coupler is not clearly visible in FIG. 2A because device 200 is depicted with the at least one adaptive coupler completely retracted and contained within the eight pod structures 201. In other words, device 200 is depicted in FIG. 2A in the smallest/tightest annular configuration that device 200 can adopt in order to accommodate the smallest user form with which device 200 is compatible. Further structures and components of device 200 (e.g., electrical circuitries, connector ports, batteries, etc.) are omitted from FIG. 2A in order to reduce clutter. A person of skill in the art will appreciate that the omission of any component in any Figure is for the purpose of enhancing illustrative clarity of other components and in no way indicates the omitted component is somehow of lesser utility or value to the present systems, articles, and methods. Furthermore, FIG. 2A depicts all of pod structures 201 as substantially the same as one another, whereas in practice different pod structures may embody different shapes, sizes, components, and/or functions. For example, in FIG. 1 pod structure 108 is of a different size and shape from pod structure 101 because pod structure 108 includes battery 131, transmitter 132, and connector port 133.

The physical spacing between the respective sensors 210 of each respective pair of adjacent pod structures 201 in device 200 may be characterized in at least two ways: a circumferential spacing C and an angular spacing θ. The circumferential spacing C refers to the distance between adjacent sensors 210 measured along the circumference or perimeter of the annular configuration of pod structures 201. In FIG. 2A, the circumference of the annular configuration of pod structures 201 is approximately represented by dashed line 251. The term "circumference" and variations such as "circumferential" are used in an approximate sense throughout this specification and the appended claims to refer to the general vicinity of the perimeter of a closed or generally annular structure. The closed or generally annular structure may be an at least approximately circular geometry or a polygonal geometry (e.g., pentagon, hexagon, heptagon, octagon, nonagon, dodecagon) with a substantially closed inner perimeter and a substantially closed outer perimeter spaced radially outward from the inner perimeter across a dimension (e.g., thickness) of the pod structures, links or units 201 that form the wearable electronic device 200. Each pod structure, link or unit 201 may have a generally flat cross sectional profile (as illustrated), to form a polygonal structure. Alternatively, each pod structure, link or unit 201, may have a respective arcuate cross sectional profile to form a curved, circular or substantially circular structure. Unless the specific context requires otherwise, a person of skill in the art will understand that the terms "circumference" and "circumferential" as used herein are not intended to limit the corresponding description to the outer surface of a precisely circular form. Thus, even though the annular configuration of pod structures 201 is depicted as octagonal in FIG. 2A, the octagonal annular configuration is still described as having a circumference 251.

The circumferential spacing C between adjacent sensors 210 depends on the length(s) of the at least one adaptive coupler that provides physical coupling between respective pairs of adjacent pod structures 201. Thus, because the length of the at least one adaptive coupler is variable, the circumferential spacing C is similarly variable. And because the circumferential spacing C is variable, the circumference 251 itself is variable. As previously described, device 200 is depicted in FIG. 2A in the smallest/tightest annular configuration that device 200 can adopt (i.e., with the at least one adaptive coupler completely retracted and contained within the eight pod structures 201) in order to accommodate a small user form. Therefore, FIG. 2A depicts device 200 in an annular configuration with minimal circumferential spacing C between adjacent pod structures 201.

In geometrical terms, the circumferential spacing C is the length of the arc that subtends the angle θ formed by: a first ray extending from the center/origin of the circumference 251 of the annular configuration of pod structures 201 and passing through a first sensor 210; and a second ray extending from the center/origin of the circumference 251 of the annular configuration of pod structures 201 and passing through a second sensor 210 that is adjacent the first sensor. The angle θ has a vertex at the center/origin of the circumference 251 of the annular configuration of pod structures 201. Throughout this specification and the appended claims, the term "angular spacing" refers to the size of this angle θ, which depends on both the length of the variable (i.e., "adaptive") physical coupling between adjacent pod structures 201 (i.e., on the size of the circumferential spacing C) and on the radius of the annular configuration of pod structures 201. In accordance with the present systems, articles, and methods, when the circumferential spacing C between respective pairs of adjacent pod structures 201 of wearable electronic device 200 is increased to accommodate the form of a user (i.e., a user whose form is too large to fit in the annular configuration of pod structures 201 with the circumferential spacing C depicted in FIG. 2A), the radius of the annular configuration of pod structures 201 also increases. In this way, device 200 achieves at least approximately equal and/or constant angular spacing θ between respective sensors 210 of adjacent pod structures 201 regardless of the form of the user wearing the device.

Figure 2B:
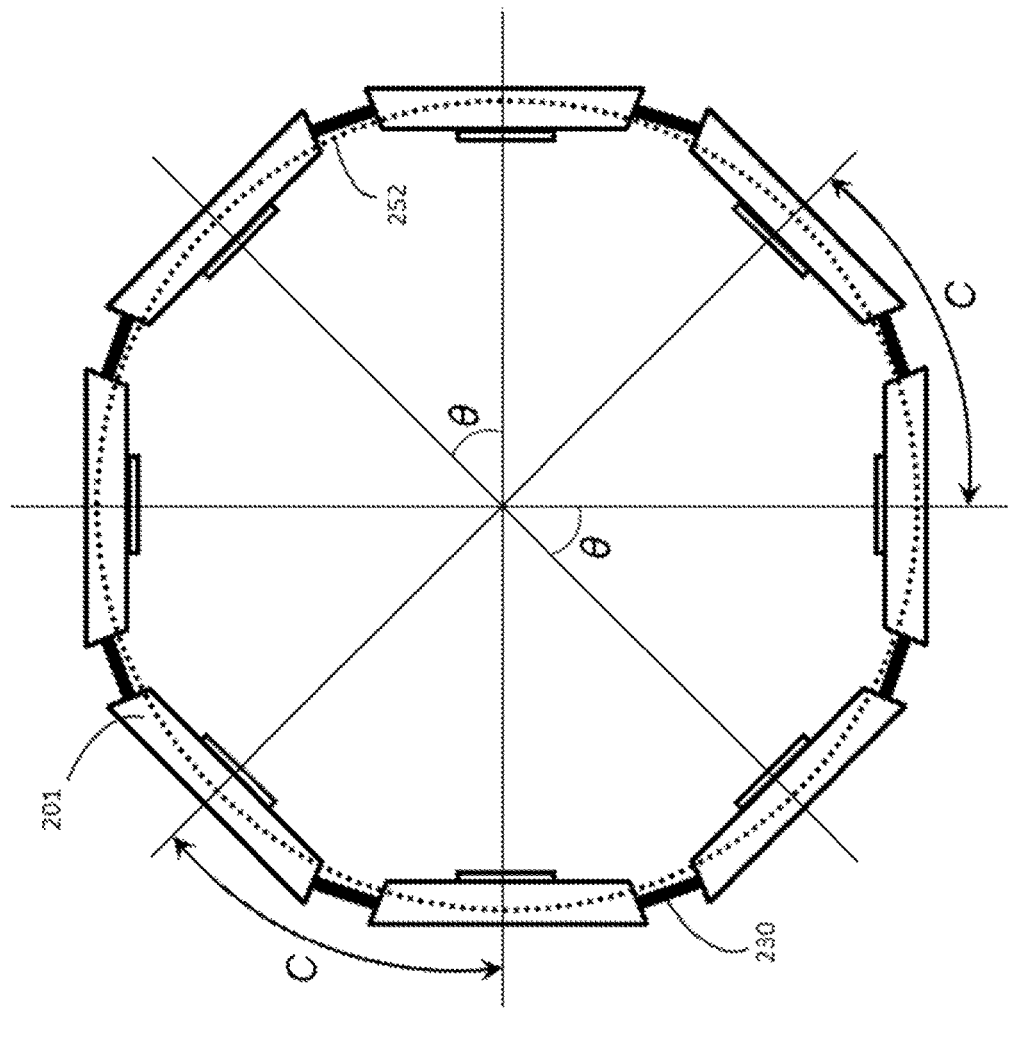
FIG. 2B is another side-elevation view of the device from FIG. 2A, showing an annular configuration of pod structures having a circumference or perimeter that is larger than a corresponding circumference or perimeter from FIG. 2A in accordance with the present systems, articles, and methods.

FIG. 2B is another side-elevation of device 200 from FIG. 2A, showing an annular configuration of pod structures 201 having a circumference 252 that is larger than circumference 251 from FIG. 2A. In other words, FIG. 2B depicts device 200 with larger circumferential spacing C between adjacent pod structures 201 than that depicted in FIG. 2A in order to accommodate a user with a larger form than would fit in circumference 251 from FIG. 2A. The circumferential spacing C in FIG. 2B is larger than the circumferential spacing C in FIG. 2A because adaptive couplers 230 (only one called out in FIG. 2B to reduce clutter) providing physical coupling between respective pairs of adjacent pod structures 201 have extended in length to accommodate the larger user form. Thus, adaptive couplers 230 that were fully-retracted and not visible in FIG. 2A are partially extended or expanded and visible in FIG. 2B.

Although the circumferential spacing C of circumference 252 depicted in FIG. 2B is larger than the circumferential spacing C of circumference 251 depicted in FIG. 2A, the angular spacing θ is at least approximately the same in both Figures. In accordance with the present systems, articles, and methods, when the circumference of device 200 is increased to accommodate a larger user form, the radius of device 200 also increases and, as a result, the angular spacing θ between respective sensors 210 of adjacent pod structures 201 remains at least approximately constant regardless of the form of the user wearing device 200. In this way, the operation/performance of device 200 (and the placement/positioning of sensors 210 thereof) is made substantially robust against variations in the form of the user of device 200.

Figure 2C:
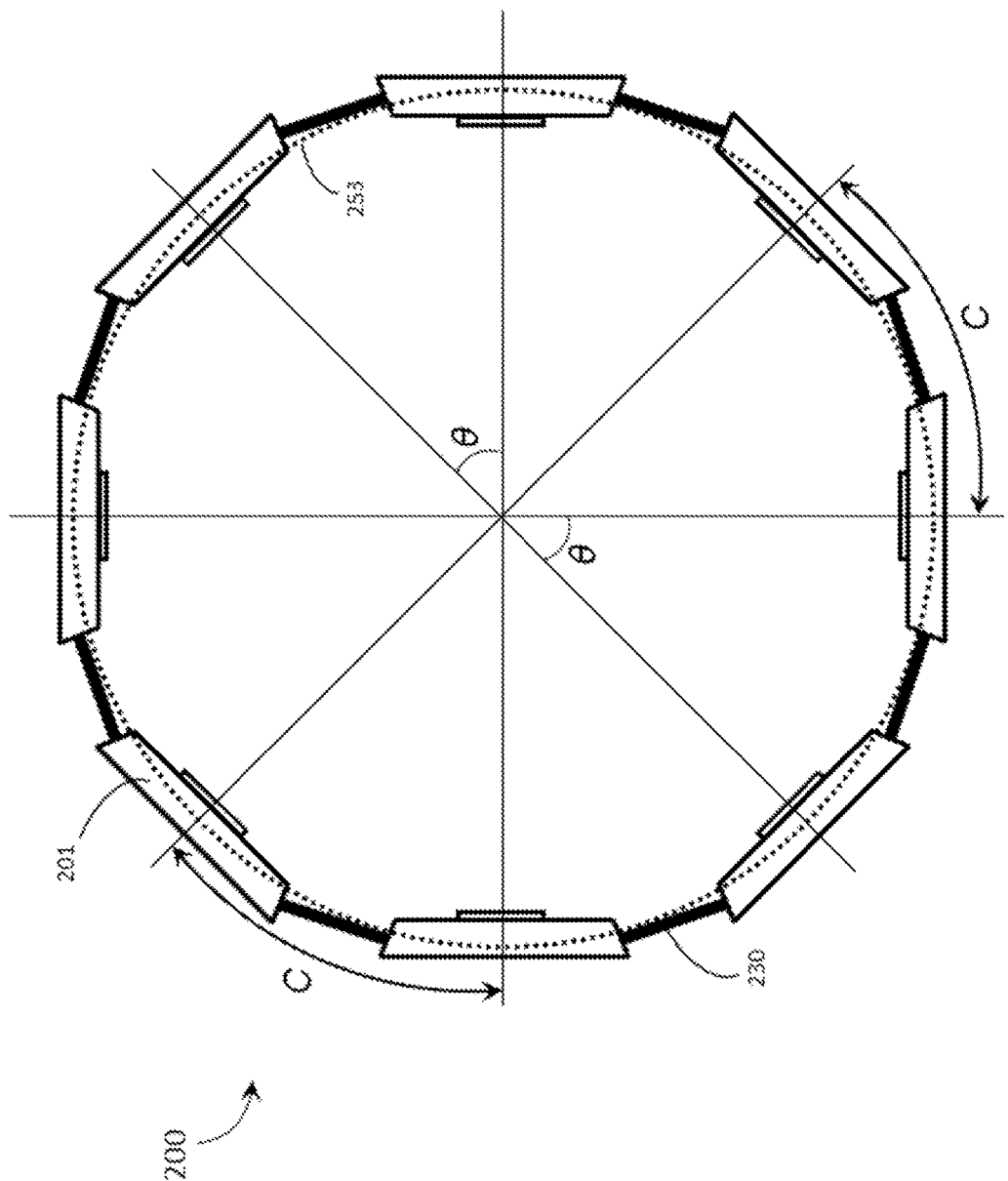
FIG. 2C is another side-elevation view of the device from FIG. 2A and FIG. 2B, showing an annular configuration of pod structures having a circumference or perimeter that is larger than both the corresponding circumference or perimeter from FIG. 2A and the corresponding circumference or perimeter from FIG. 2B in accordance with the present systems, articles, and methods.

FIG. 2C is another side-elevation of device 200 from FIG. 2A and FIG. 2B, showing an annular configuration of pod structures 201 having a circumference 253 that is larger than both circumference 251 from FIG. 2A and circumference 252 from FIG. 2B. In FIG. 2C, device 200 is depicted in the largest/loosest annular configuration that device 200 can adopt (i.e., with the at least one adaptive coupler 230 completely extended or expanded) in order to accommodate the largest user form with which device 200 is compatible. Therefore, FIG. 2C depicts device 200 in an annular configuration with maximal circumferential spacing C between adjacent pod structures 201. Although the circumferential spacing C of circumference 253 depicted in FIG. 2C is larger than both the circumferential spacing C of circumference 252 depicted in FIG. 2B and the circumferential spacing C of circumference 251 depicted in FIG. 2A, the angular spacing θ is at least approximately the same in all three Figures. Thus, the angular spacing θ of device 200 is substantially robust against variations in the form of the user.

Figure 2D:
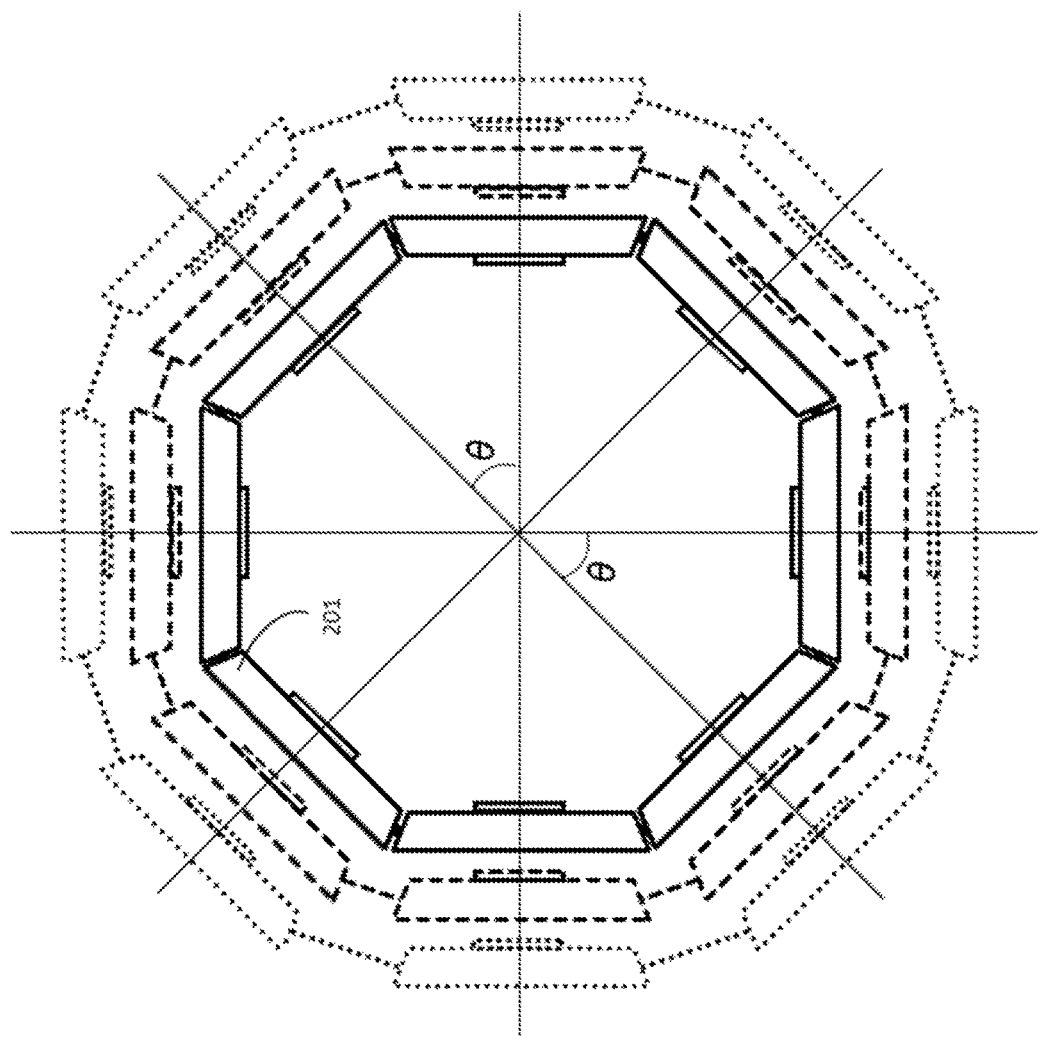
FIG. 2D is a side-elevation view of the device from FIGS. 2A, 2B, and 2C, showing the three respective annular configurations of pod structures from FIGS. 2A, 2B, and 2C, all overlaid in one Figure to facilitate comparison.

FIG. 2D is a side-elevation of device 200 showing the three annular configurations of pod structures 201 from FIGS. 2A, 2B, and 2C, all overlaid in one Figure to facilitate comparison. The smallest/tightest annular configuration of pod structures 201 having circumference 251 from FIG. 2A is depicted in solid lines, the intermediate configuration of pod structures 201 having circumference 252 from FIG. 2B is depicted in coarsely-dashed lines, and the largest/loosest annular configuration of pod structures 201 having circumference 253 from FIG. 2C is depicted in finely-dashed lines. Lines representing circumferences 251, 252, and 253 are not shown in FIG. 2D to reduce clutter. FIG. 2D clearly demonstrates that the angular spacing θ for device 200 is substantially constant regardless of the circumference, circumferential spacing C, or form of the user.

The present systems, articles, and methods describe maintaining a substantially constant angular spacing θ between respective sensors of respective pairs of adjacent pod structures in a wearable electronic device. As previously described, substantially constant angular spacing θ between sensors may be particularly advantageous for, e.g., a wearable electronic device employing electromyography sensors (e.g., in a muscle interface device). Electromyography sensors detect electrical signals produced by muscle activity and their operation/performance can be heavily influenced by their proximity to certain muscles. For example, device 200 may be worn on the arm of a user and sensors 210 may detect muscle activity corresponding to physical gestures performed by the arm, hand, and/or fingers of the user. The arm contains multiple muscle groups that activate in characteristic ways when a user performs a particular gesture, and the angular spacing between these muscle groups may be substantially the same regardless of the form of the user. Device 200 may be calibrated to detect and characterize gestures based on a particular relationship between the angular spacing between muscle groups in the arm and the angular spacing θ between sensors 210. Thus, maintaining a substantially constant angular spacing θ between respective pairs of adjacent electromyography sensors 210 may improve the robustness of the operation/performance of a wearable electromyography device against variations in the form of the user.

The present systems, articles, and methods also describe maintaining a substantially equal (i.e., evenly or uniformly distributed) angular spacing θ between respective sensors of respective pairs of adjacent pod structures in a wearable electronic device. The use of pair-wise adaptive couplers 230 enables the circumferential spacing C of an annular configuration of pod structures 201 to vary uniformly between each respective pair of adjacent pod structures 201, and as a result the angular spacing θ between respective pairs of adjacent sensors 210 may vary uniformly as well. Device 200 may be calibrated to detect and characterize gestures based on an equal (i.e., even or uniform) distribution of sensors 210, and maintaining an equal angular spacing θ between respective pairs of adjacent electromyography sensors 210 may improve the robustness of the operation/performance of a wearable electromyography device against variations in the form of the user. Thus, the various embodiments described herein provide systems, articles, and methods that enhance robustness against variations in user form by ensuring at least one or both of: a) substantially constant angular spacing θ between respective pairs of adjacent sensors regardless of user form; and/or b) substantially equal (i.e., evenly or uniformly distributed) angular spacing θ between every respective pair of adjacent sensors regardless of user form.

Figure 3B:
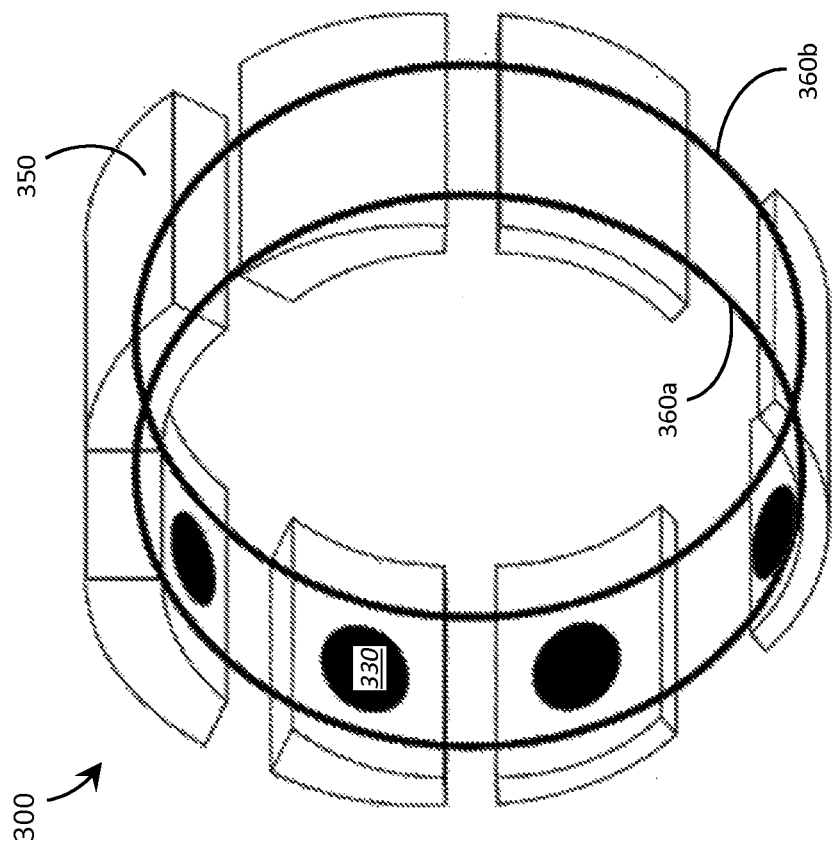
FIG. 3B is a schematic diagram of the muscle interface device from FIG. 3A in an expanded configuration corresponding to being worn on a larger user form, in accordance with the present systems, articles, and methods.

As previously described, the at least one adaptive coupler (230) that physically couples between one or more respective pair(s) of pod structures (201) is extendable/stretchable/expandable and may include elastic material. In accordance with the present systems, articles, and methods, elastic material is particularly well-suited for use as/in an adaptive coupler (230) because elastic material is "resiliently expandable" and, when expanded, exhibits a restorative force that can provide the tension necessary to hold an annular wearable electronic device on a limb of the user. Throughout this specification and the appended claims, the term "resiliently expandable" is generally used to refer to any element or material that allows limited deformation under moderate stresses and strains but exhibits a restoring force that effects an inherent resiliency, i.e., a tendency to return to its original shape or configuration when the stresses or strains are removed. Elastic material is a non-limiting example of a resiliently expandable material. Examples of a wearable electronic device that implements elastic bands as adaptive couplers are illustrated in FIGS. 3A and 3B.

Figure 3A:
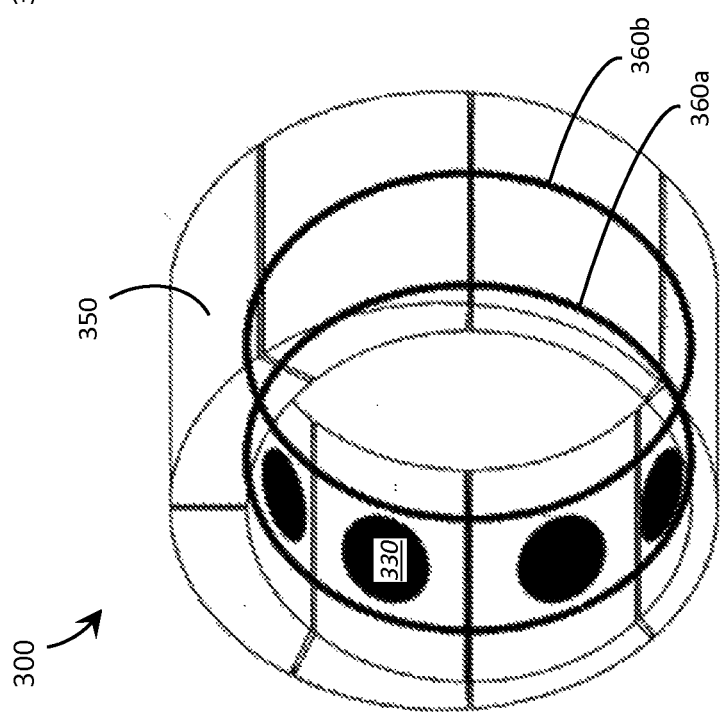
FIG. 3A is a schematic diagram of a muscle interface device that employs two continuous "resiliently expandable" elastic bands as adaptive couplers that adaptively physically couple a set of seven pod structures in an annular configuration in accordance with the present systems, articles, and methods.

FIG. 3A is a schematic diagram of a muscle interface device 300 that employs two continuous "resiliently expandable" elastic bands 360a and 360b as adaptive couplers that adaptively physically couple a set of seven pod structures 350 (only one called out in the Figure to reduce clutter) in an annular configuration in accordance with the present systems, articles, and methods. Exemplary muscle interface device 300 is configured to be worn on the forearm of the user. Each pod structure 350 includes one or more sensors 330 (only one called out in the Figure to reduce clutter) such as a capacitive electromyography (cEMG) sensor, a surface electromyography (sEMG) sensor, a mechanomyography (MMG) sensor, or an inertial measurement unit (IMU), for example. One or more of the pod structures 350 may also contain a haptic feedback module including a vibrating mechanism, and/or other notification mechanisms, including for example an LED indicator light.

In order to cover forearm circumferences of the majority of users (e.g., from the age of twelve and up), resiliently expandable bands 360a and 360b may be configured to provide a particular stretching factor, i.e., a particular ratio of "stretch length":"unstretched length." A person of skill in the art will appreciate that the stretching factor for an elastic band depends on a number of properties, including the material used, the density of the material used, the dimensions of the band, and so on. While in general any stretching factor may be implemented, a stretching factor in the range of about 2 to 3, (e.g., a stretching factor of about 2.4) is generally found to accommodate a wide range of user forms. In order to achieve this degree of expansion/contraction, the resiliently expandable band may be formed from a variety of elastic materials, such as elasticized fabric, latex or rubber, for example. Resilient, mechanically expandable linkages similar in structure to metal wrist bands for watches may also be used.

In exemplary muscle interface device 300 of FIG. 3A, pod structures 350 are attached to two continuous bands of elastic material 360a and 360b. Alternatively, the elastic material may be provided between each adjacent pod structure 350 such that pod structures 350 are continuously connected by the elastic material between each adjacent pair, or separate, discrete sections of elastic material may provide adaptive physical coupling between respective pairs of pod structures 350. Some implementations may employ a single band of elastic material (i.e., band 360a or 360b) or more than two band of elastic material.

The elasticity of the material(s) between pod structures 350 may be selected to be substantially the same, in order to allow pod structures 350 to expand away from each other substantially uniformly as the band(s) 360a and/or 360b is/are stretched onto the user's limb (e.g., forearm).

FIG. 3B is a schematic diagram of muscle interface device 300 from FIG. 3A in an expanded configuration corresponding to being worn on a larger user form, in accordance with the present systems, articles, and methods. In this example, pod structures 350 maintain a same relative position with respect to one another (i.e., a same order and a same angular spacing θ), regardless of the size of the forearm of the user, and the amount of stretching that the resiliently expandable bands 360a and 360b undergo. However, in an alternative implementation, the relative elasticity of the elastic material(s) provided between each respective pair of pod structures 350 may be different, such that there is a controlled but uneven expansion of pod structures 350 around the forearm of the user. This may be useful, for example, if it is desired that there be little or no stretching/expansion between two of the pods (e.g. between 250a and 250b), while there should be stretching between the remainder of the pods.

Elastic bands 360a and 360b are completely visible in the views of FIGS. 3A and 3B for illustrative purposes only. In general, the portions of bands 360a and 360b that are contained within pod structures will not be visible unless pod structures 350 are formed of transparent or translucent material, or pod structures 350 include holes or windows through which bands 360a and 360b may be seen.

In exemplary muscle interface device 300, pod structures 350 are positioned substantially equidistant from each other, such that the expansion of pod structures 350 is uniform and they remain substantially equidistant from each other when muscle interface device 300 is in a stretched state. Advantageously and in accordance with the present systems, articles, and methods, exemplary muscle interface device 300 shown in FIGS. 3A and 3B does not require that the sensors 330 in pod structures 350 be placed in exactly the same location on the user's arm every time the user puts the device on. In other words, the user is not required to orient muscle interface device 300 in the same way each time he/she slides device 300 onto his/her arm. Rather, the constant order of and angular spacing between pod structures 350 helps to ensure that the sensors 330 are properly aligned regardless of variations in the size of forearm of the user.

As the circumference of a user's forearm is, typically, greater near the elbow than near the wrist, the surface of the skin typically tapers as it approaches the hand. To accommodate this form, the various embodiments of wearable electronic devices (e.g., muscle interface devices) described herein may, if so desired, have a generally frusto-conical shape to conform to the taper of the forearm. For example, each of pod structures may, in some implementations, be suitably shaped to form a segment of the generally frusto-conical shape in order to conform to the taper of a forearm.

The resiliently expandable bands 360a and 360b of muscle interface device 300 allow device 300 to be worn by users having differently sized forearms. Furthermore, by stretching substantially uniformly, the resiliently expandable bands 360a and 360b also ensure that the relative spaced apart positions of sensors 330 around a forearm are maintained from user to user, at least within a predictable range.

In order to provide electrical connections for all of the sensors 330 at each of the pod structures around the circumference of device 300, a bent wiring harness or flexible PCB interconnect may be utilized between each respective pair of adjacent pod structures 350.

Figure 4:
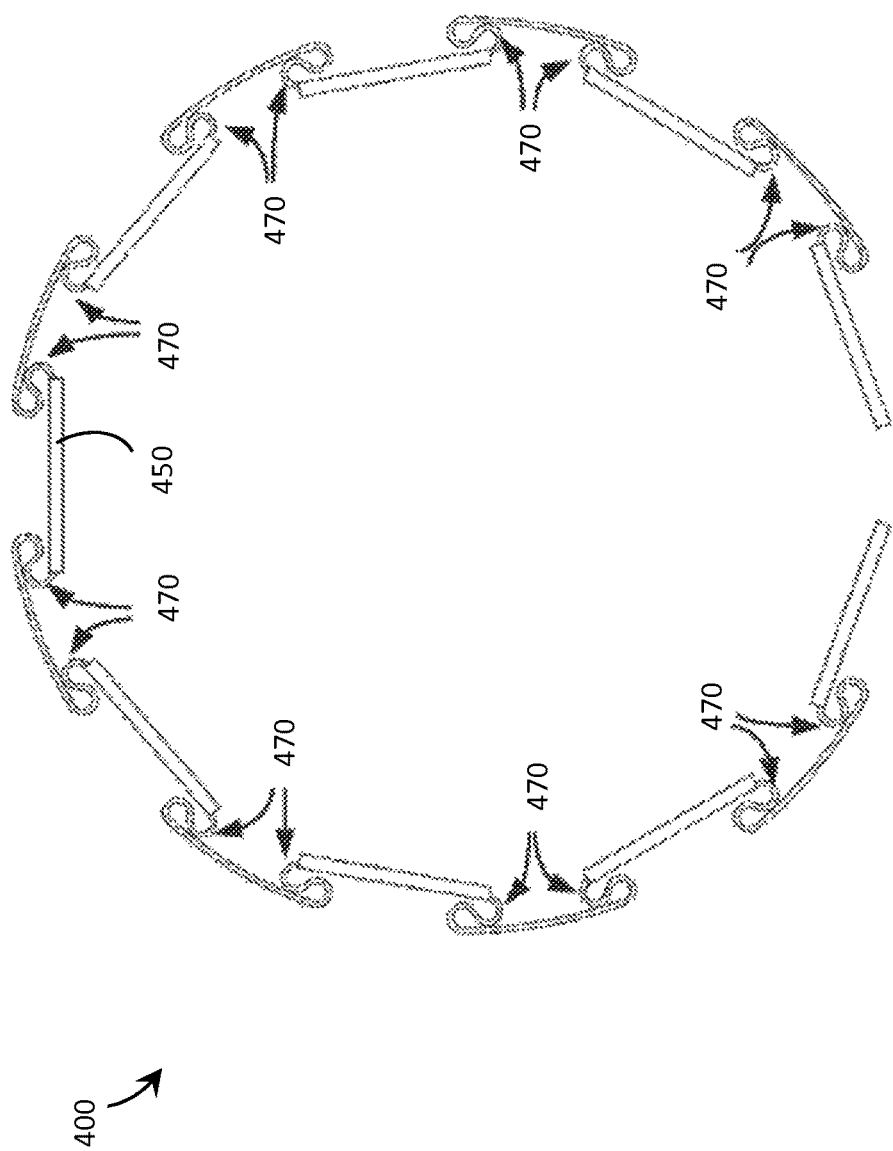
FIG. 4 is a schematic diagram of a wearable electronic device implementing folded or bent wiring harnesses in between adjacent pod structures in accordance with the present systems, articles, and methods.

FIG. 4 is a schematic diagram of a wearable electronic device 400 implementing folded or bent wiring harnesses 470 in between adjacent pod structures 450 in accordance with the present systems, articles, and methods. The wire harnesses 470 may be folded about 180 degrees in between each pair of pod structures 450 when device 400 is in its rest/contracted/unexpanded state (i.e., as illustrated in FIG. 3A). At each pod structure 450, the corresponding wiring harness 470 may have a break-out of a plurality of wires may be are used to connect to the pod structure 450 and provide power, ground, virtual ground, and output wiring. By connecting each of the pod structures 450 in this way, pod structures 450 are able to expand away from one another while maintaining electrical connections. The slack wire harnessed in between each respective pair of pod structures 450 is taken up as device 400 expands (as in FIG. 3B) to accommodate different user forms. To keep the wire(s) from bending in the wrong direction in between pod structures 450 and getting pinched or touching the user's skin etc., a guide may be used as described, for example, in U.S. Provisional Patent Application Ser. No. 61/857,105. As examples, this guide can either be a separate smaller pod which is also affixed to the adaptive couplers, or it can be done in the way of a molded interconnect in between each pod structure 450 which contains a track into which the wires are placed. Wiring harnesses 470 may include flex printed circuit board (PCB) interconnects.

As each segment 101, 102, 103, 104, 105, 106, 107, and 108 in device 100 includes electronic circuitry, each of segments 101, 102, 103, 104, 105, 106, 107, and 108 is referred to herein as an electronic circuit structure. Throughout this specification and the appended claims, the term "electronic circuit structure" is used to refer to an individual segment, pod, section, component, etc. of a wearable electronic device, where the individual segment, pod, section, component, etc. includes or carries electronic circuitry. For the purposes of the present systems, articles, and methods, an "individual segment, pod, section, component, etc." of a wearable electronic device is characterized by its ability to be moved or displaced relative to another segment, pod, section, component, etc. of the wearable electronic device. For example, segments 101 and 102 of device 100 are respective electronic circuit structures of device 100 because segments 101 and 102 can each be moved or displaced relative to one another (within the constraints imposed by the adaptable coupler) and segments 101 and 102 each include or carry electronic circuitry. The need for electronic circuit structures 101 and 102 to be movable/displaceable relative to one another specifically arises because device 100 is a wearable electronic device that must accommodate the movements of a user.

In a wearable electronic device that employs multiple electronic circuit structures (such as device 100 from FIG. 1), each electronic circuit structure may also be characterized by a need to be electrically connected or electrically coupled to at least one other electronic circuit structure within the wearable electronic device. Thus, device 100 also includes a plurality of electrically conductive pathway sets (not shown in FIG. 1), where each respective pair of adjacent electronic circuit structures 101, 102, 103, 104, 105, 106, 107, and 108 is electrically coupled together by a respective electrically conductive pathway set. As a consequence of the requirement for adjacent pairs of electronic circuit structures 101, 102, 103, 104, 105, 106, 107, and 108 to be both electrically coupled together and movable/displaceable relative to one another, the electrically conductive pathway sets that provide electrical coupling between adjacent pairs of electronic circuit structures 101, 102, 103, 104, 105, 106, 107, and 108 are exposed to stresses and strains that can ultimately cause at least some electrically conductive pathway sets to break and/or to become detached. The various embodiments described herein provide systems, articles, and methods that mitigate stresses and strains to which wiring components in wearable electronic devices are exposed and thereby enhance the robustness, longevity, practicality, and overall viability of wearable electronic devices.

Many of the features and details described above (e.g., adaptable coupler(s), electrically conductive pathway sets, electronic circuitry, etc.) are not shown in FIG. 1 because FIG. 1 depicts electronic circuit structures 101, 102, 103, 104, 105, 106, 107, and 108 with closed and optically opaque housings. The features described but not shown in FIG. 1 are concealed by these housings. In order to expose specific features, FIGS. 5A, 5B, 6, 7, and 8 provide illustrations with various housings, coverings, and/or components omitted. A person of skill in the art will appreciate that the omission of any component in any Figure is for the purpose of enhancing illustrative clarity of other components and in no way indicates the omitted component is somehow of lesser utility or value to the present systems, articles, and methods.

FIGS. 5A, 5B, 6, 7, and 8 provide further details of the inter- and intra-components of electronic circuit structures 101, 102, 103, 104, 105, 106, 107, and 108 from FIG. 1. For the purposes of the present systems, articles, and methods, electronic circuit structures 101, 102, 103, 104, 105, 106, 107, and 108 are substantially similar to one another; therefore, in order to reduce clutter, FIGS. 5A, 5B, 6, 7, and 8 illustrate further details of only one or two exemplary adjacent electronic circuit structures (e.g., electronic circuit structures 101 and 102 from FIG. 1). A person of skill in the art will appreciate that the details shown for two exemplary adjacent electronic circuit structures (e.g., electronic circuit structures 101 and 102 from FIG. 1) in FIGS. 5A, 5B, 6, 7, and 8 may similarly apply to any number of electronic circuit structures (e.g., including any or all of electronic circuit structures 103, 104, 105, 106, 107, and 108 from FIG. 1). The number of electronic circuit structures included in a wearable electronic device is dependent on at least the nature, function(s), and design of the wearable electronic device, and the present systems, articles, and methods may be applied to any wearable electronic device employing any number of electronic circuit structures.

FIG. 5A is a perspective view of a portion of an exemplary wearable electronic device 500 with a built-in strain mitigation system 550 for mitigating physical strain on an internal wiring component 520 (shaded in FIG. 5A to enhance clarity) in accordance with the present systems, articles and methods. Device 500 is substantially similar to device 100 from FIG. 1. Specifically, device 500 includes two adjacent electronic circuit structures 501, 502 which are substantially similar to adjacent electronic circuit structures 101, 102 (respectively) from FIG. 1, except FIG. 5A does not depict housings covering electronic circuit structures 501, 502.

Device 500 includes two adaptable couplers 531, 532 that both provide adaptable physical coupling between electronic circuit structures 501 and 502. In exemplary device 500, adaptable couplers 531, 532 are each realized by a respective elastic band. Elastic band 531 is physically coupled to both electronic circuit structure 501 and electronic circuit structure 502 and provides elastic physical coupling therebetween, and elastic band 532 is also physically coupled to both electronic circuit structure 501 and electronic circuit structure 502 and also provides elastic physical coupling therebetween. A person of skill in the art will appreciate, however, that the adaptable coupling between electronic circuit structures 501 and 502 may be achieved by a variety of different adaptable couplers, including but not limited to: spring connectors; fabric, straps, or other flexible materials with length/tension adaptable by Velcro®, snaps, hooks, buttons, or other adjustable connectors; string, rope, or wire with length/tension adaptable by hand, dial, lever, or motor; etc. Furthermore, while device 500 employs two disparate elastic bands 531, 532 to achieve adaptable physical coupling between electronic circuit structures 501, 502, adaptable physical coupling may similarly be achieved using more or fewer elastic bands.

[Wiring component 520 is an example of an "electrically conductive pathway set" (as described previously in the context of FIG. 1) that provides electrical coupling between adjacent electronic circuit structures 501 and 502. In exemplary device 500, electrically conductive pathway set 520 is realized by a flexible printed circuit board that is electrically coupled to electronic circuitry 511 in electronic circuit structure 501 and to electronic circuitry 512 in electronic circuit structure 502 (details of electronic circuitry 511 and electronic circuitry 512 are omitted to reduce clutter). The flexible printed circuit board typically includes a number of electrically insulative layers (e.g., FR4) and a number of electrically conductive paths or traces carried by one or more of the insulative layers. The electrically conductive paths or traces may be on an exterior surface of an outermost layer, or on an interior surface of either an outermost layer or an inner layer. The flexible printed circuit board may optionally include one or more vias, electrically connecting electrically conductive paths or traces on two or more layers.

A person of skill in the art will appreciate that electrically conductive pathway set 520 may similarly be realized by other forms of electrically conductive pathways, including but not limited to: discrete wires, discrete cables, ribbon cables, elastic conductors, etc. Similarly, electrical coupling between electrically conductive pathway set 520 and each of electronic circuitry 511, 512 may be achieved through a variety of different electrical connections, including but not limited to: one or multiple solder connections (e.g., hot bar solder connections), one or multiple connectors (e.g., ZIF connectors, plug and socket connectors, insulation-displacement connectors, crimp-on connectors), etc.

As previously described, electronic circuit structures 501, 502 are advantageously flexibly coupled together by elastic bands 531, 532 in order to accommodate movements by the user (i.e., the "wearer") of wearable electronic device 500. Such movements can impose physical strains on flexible printed circuit board 520. In accordance with the present systems, articles and methods, strain mitigation system 550 mitigates physical strain on flexible printed circuit board 520. In exemplary device 500, strain mitigation system 550 comprises a guide structure 551 that is physically coupled to electronic circuit structure 501 and projects at least partially over electronic circuitry 512 in electronic circuit structure 502. A first portion of flexible printed circuit board 520 extends across a length of guide structure 551 such that at least a portion of guide structure 551 serves as a bearing surface for flexible printed circuit board 520. Since flexible printed circuit board 520 may include multiple electrically conductive pathways, the configuration depicted in FIG. 5A ensures that at least a first portion of each electrically conductive pathway in flexible printed circuit board 520 extends across a length of guide structure 551. The entirety of flexible printed circuit board 520 is shaded in FIG. 5A (including portions of flexible printed circuit board 520 that are "behind" or otherwise visually obscured by other components of device 500 in the perspective view of FIG. 5A) in order to clearly illustrate the serpentine path taken by flexible printed circuit board 520 through strain mitigation system 550. To more clearly call out some of the features of strain mitigation system 550 and the relationships between guide structure 551 and flexible printed circuit board 520, FIG. 5B is provided.

FIG. 5B is a perspective view of a portion of strain mitigation system 550 of device 500 from FIG. 5A with the other components of device 500 removed. Some components of strain mitigation system 550 are not included in FIG. 5B to reduce clutter. FIG. 5B clarifies that guide structure 551 of strain mitigation system 550 includes a first surface 552 and an edge 553. Guide structure 551 also includes a second surface not visible in FIG. 5B (i.e., a surface on the opposite side of guide structure 551 in relation to first surface 552). With reference to both FIG. 5A and FIG. 5B, a first portion of flexible printed circuit board 520 extends across a length of first surface 552 of guide structure 551, a second portion of flexible printed circuit board 520 bends around edge 553 of guide structure 551, and a third portion of flexible printed circuit board 520 extends across at least a portion of a length of the second surface of guide structure 551. The path followed by flexible printed circuit board 520 over or through guide structure 551 is a serpentine path characterized by flexible printed circuit board 520 wrapping around guide structure 551 and/or turning back on itself at least once. In this configuration, the length of the third portion of flexible printed circuit board 520 that extends across at least a portion of a length of the second surface of guide structure 551 is variable and depends on the distance between adjacent electronic circuit structures 501 and 502. In FIG. 5A, adjacent electronic circuit structures 501 and 502 are depicted in close proximity to one another (e.g., touching one another) and elastic bands 531 and 532 are retracted; however, the physical coupling provided by elastic bands 531 and 532 is designed to be adaptable (i.e., extendable, extensible, flexible, stretchable, etc.) to accommodate the sizes and movements of different users. Elastic bands 531 and 532 may be extended and the distance between adjacent electronic circuit structures 531 and 532 may be increased. When the distance between adjacent electronic circuit structures 501 and 502 is increased, guide structure 551 slides over electronic circuitry 512 in electronic circuit structure 502 and the length of the third portion of flexible printed circuit board 520 that extends across at least a portion of a length of the second surface of guide structure 551 decreases. The length of the third portion of flexible printed circuit board 520 that extends across at least a portion of a length of the second surface of guide structure 551 is maximal when electronic circuit structures 501 and 502 are closest together (e.g., touching) and minimal when electronic circuit structures 501 and 502 are furthest apart. In this way, the physical coupling between electronic circuit structures 501 and 502 is made adaptable while mitigating the exposure of the electrical coupling (i.e., flexible printed circuit board 520) between electronic circuit structures 501 and 502 to varying tensions, stresses, torsions, strains, etc. Guide structure 551 also continues to shield flexible printed circuit board 520 from direct exposure to environmental elements and forces even when the distance between electronic circuit structures 501 and 502 is increased.

As depicted in FIG. 5B, guide structure 551 may include a recessed channel 571 that extends across a length thereof (e.g., across a length of first surface 552 of guide structure 551) for receiving flexible printed circuit board 520. In other words, flexible printed circuit board 520 may extend across a length of guide structure 551 within recessed channel 571 in first surface 552 of guide structure 551. Recessed channel 571 provides sidewalls 572, 573 that help to keep the first portion of flexible printed circuit board 520 in longitudinal and lateral position over the length of first surface 552 of guide structure 551. For example, at least first surface 552 and edge 553 provide bearing surfaces for flexible printed circuit board 520, while first surface 552 also provides a "longitudinal" guiding function of guide structure 551 and sidewalls 572, 573 provide a "transversal" or lateral guiding function of guide structure 551.

With reference to both FIG. 5A and FIG. 5B, strain mitigation system 550 may further include pivot structures 541 and 542 for pivotally (e.g., rotatably) coupling to electronic circuit structure 501. Thus, the physical coupling between guide structure 551 of strain mitigation system 550 and electronic circuit structure 501 may be pivotal coupling through pivot structures 541 and 542 of strain mitigation system 550. Pivotal coupling between guide structure 551 of strain mitigation system 550 and electronic circuit structure 501 may improve the fit of wearable device 500 for the user and/or facilitate mobility of the user. For example, as the distance between electronic circuit structures 501 and 502 is increased to accommodate the size and/or movements of a user (within the constraints imposed by the adaptable coupler(s), e.g., elastic bands 531 and 532), pivot structures 541 and 542 enable device 500 to better fit to the contours of the user's form and thereby further mitigate physical strains on flexible printed circuit board 520.

FIG. 5A shows only a portion of device 500 to emphasize features and details of a first strain mitigation system 550 between a first electronic circuit structure 501 and a second electronic circuit structure 502. However, as illustrated in FIG. 1, a wearable electronic device (e.g., device 100) may employ more than two electronic circuit structures (e.g., a third electronic circuit structure and/or at least one additional electronic circuit structure) and, accordingly, more than one strain mitigation system (e.g., a second strain mitigation system, a third strain mitigation system, and/or at least one additional strain mitigation system). For example, FIG. 5A depicts a portion of a third electronic circuit structure 503 adjacent electronic circuit structure 502 and a portion of a second strain mitigation system 590 pivotally coupled to electronic circuit structure 502 and projecting into electronic circuit structure 503.

As previously described, when the distance between adjacent electronic circuit structures 501 and 502 is increased, guide structure 551 slides over electronic circuitry 512 in electronic circuit structure 502 and the length of the third portion of flexible printed circuit board 520 that extends across at least a portion of a length of the second surface of guide structure 551 decreases. To facilitate the motion of guide structure 551 over electronic circuitry 512, strain mitigation system 550 may further include a structure or structures to provide slideable coupling between guide structure 551 and electronic circuit structure 502. An exemplary strain mitigation system that provides slideable coupling between guide structure 551 and electronic circuit structure 502 is illustrated in FIG. 6, FIG. 7, and FIG. 8.

FIG. 6 is a perspective view of a portion of an exemplary wearable electronic device 600 including two adjacent electronic circuit structures 601 and 602 and a strain mitigation system 650, with electronic circuit structure 602 slideably coupled to strain mitigation system 650 in accordance with the present systems, articles, and methods. Device 600 is substantially similar to device 500 from FIG. 5A and strain mitigation system 650 is substantially similar to strain mitigation system 550 from both FIG. 5A and FIG. 5B; however, FIG. 6 clarifies that strain mitigation system further includes a protrusion 660 that protrudes out (i.e., away) from guide structure 651 in strain mitigation system 650. Protrusion 660 is depicted as protruding from a covering 670 that overlies the first surface (e.g., first surface 552) of guide structure 651; however, those of skill in the art will appreciate that protrusion 660 may alternatively be positioned anywhere on guide structure 651 and that strain mitigation system 650 may or may not include covering 670 in alternative designs. Protrusion 660 provides a component of the slideable coupling between guide structure 651 and electronic circuit structure 602 by mating with a receiving channel in a covering that overlies electronic circuit structure 602 (not shown in FIG. 6).

Figure 7:
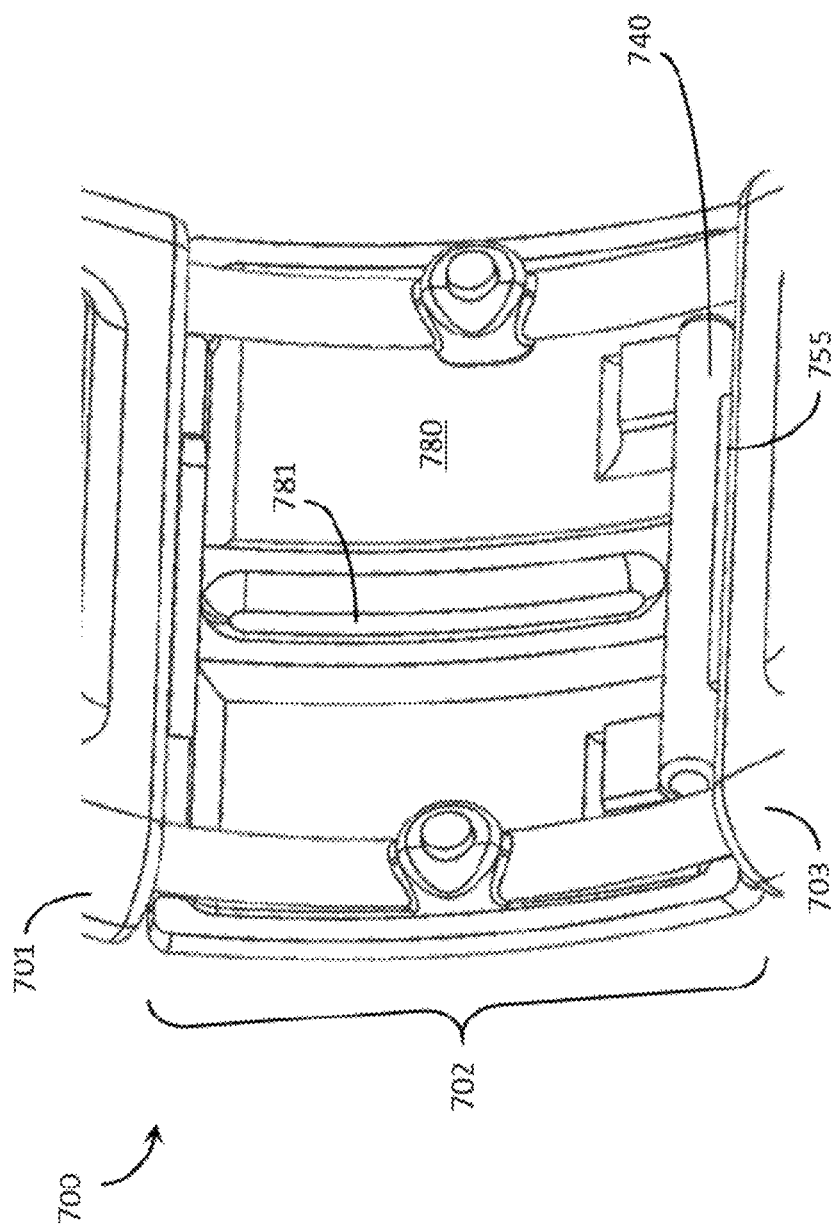
FIG. 7 is a perspective view of a portion of an exemplary wearable electronic device including an electronic circuit structure and showing a receiving channel in an underside of a covering that overlies the electronic circuit structure in accordance with the present systems, articles and methods.

FIG. 7 is a perspective view of a portion of an exemplary wearable electronic device 700 including an electronic circuit structure 702 (electronic circuitry is omitted from FIG. 7) and showing a receiving channel 781 in an underside of a covering 780 that overlies electronic circuit structure 702 in accordance with the present systems, articles and methods. Receiving channel 781 is sized and dimensioned to receive (e.g., mate with) a protrusion (e.g., protrusion 660 from FIG. 6, not shown in FIG. 7) from a guide structure (e.g., guide structure 651 from FIG. 6, not shown in FIG. 7) of a strain mitigation system (e.g., strain mitigation system 650 from FIG. 6; not shown in FIG. 7) and to thereby provide slideable coupling between the guide structure and electronic circuit structure 702. The slideable coupling between receiving channel 781 and the protrusion from the guide structure (e.g., protrusion 660 from guide structure 651) enables relative motion between electronic circuit structure 702 and an adjacent electronic circuit structure 701, but constrains this motion to directions substantially along the longitudinal axis of receiving channel 781. The longitudinal axis of receiving channel 781 may be substantially parallel to the longitudinal axis of an electrically conductive pathway set (e.g., flexible printed circuit board 520) and constraining motion to directions substantially parallel to the longitudinal axis of the electrically conductive pathway set advantageously mitigates physical strain on the electrically conductive pathway set, particularly when the electrically conductive pathway set is configured to be extendable/extensible as in, for example, the serpentine configuration described for flexible printed circuit board 520 in FIG. 5A.

FIG. 7 depicts first electronic circuit structure 702 adjacent (i.e., in between) second electronic circuit structure 701 and third adjacent electronic circuit structure 703. An electrically conductive pathway set (not shown) provides electrical coupling between electronic circuit structure 702 and electronic circuit structure 703. Strain on the electrically conductive pathway set that electrically couples between electronic circuit structures 702 and 703 is mitigated by a strain mitigation system including a guide structure 755, a portion of which is visible in FIG. 7. Guide structure 755 is physically pivotally coupled to electronic circuit structure 702 by pivot structure 740. With reference to both FIG. 7 and FIG. 5B, a pivot structure may comprise a cylindrical rod 740 that is mated with (i.e., received in) at least one cylindrical housing (at 541, 542 in FIG. 5B) such that the cylindrical rod 740 may rotate within the cylindrical housing(s) at 541, 542. The cylindrical rod 740 may be fixedly physically coupled to the guide structure 755.

FIG. 8 is a perspective view of a portion of an exemplary wearable electronic device 800 including an electronic circuit structure 802 (electronic circuitry is omitted from FIG. 8) and a strain mitigation system 850 including a guide structure 851 slideably coupled to electronic circuit structure 802 in accordance with the present systems, articles, and methods. Electronic circuit structure 802 is overlain by a covering 880 that includes a receiving channel 881 (only a portion of which is visible in FIG. 8). Receiving channel 881 is substantially similar to receiving channel 781 depicted in FIG. 7. Strain mitigation system 850 includes a covering that overlies a first surface (not visible in FIG. 8) of guide structure 851. Covering 870 includes a protrusion (similar to protrusion 660 from FIG. 6) that protrudes towards covering 880 and into receiving channel 881 such that the slideable coupling between guide structure 851 and electronic circuit structure 802 is through the protrusion and receiving channel 881. With reference back to the description of FIG. 5B, the view depicted in FIG. 8 also shows an edge 853 of guide structure 851 and a second surface 854 of guide structure 851.

FIGS. 6, 7, and 8 depict an exemplary configuration of slideable coupling between the guide structure of a strain mitigation system and an electronic circuit structure with the strain mitigation system including a protrusion projecting from the guide structure and the electronic circuit structure including a receiving channel formed in an underside of a covering. In accordance with the present systems, articles, and methods, similar slideable coupling may be achieved with a receiving channel formed in the guide structure of the strain mitigation system and a protrusion projecting from a covering in the electronic circuit structure. In general, one of the strain mitigation system and the electronic circuit structure may include a receiving channel and the other of the strain mitigation system and the electronic circuit structure may include a protrusion that protrudes into the receiving channel such that slideable coupling between the strain mitigation system and the electronic circuit structure is through the protrusion and the receiving channel.

The various embodiments described herein provide systems, articles, and methods for robust adaptable (e.g., flexible, stretchable, rotatable, etc.) electrical and physical coupling between components in wearable electronic devices. Such adaptability is advantageously provided in a wearable electronic device in order to accommodate different user sizes/forms and the movements of the user. Thus, adaptability is desirable from an ergonomic point-of-view. Physical strain on electrical coupling between elements of a wearable electronic device resulting from an adaptable physical coupler is mitigated through a strain mitigation system. Various components of the wearable electronic device may be adaptable, flexible, elastic, etc., to support ergonomic functionality and various components of the wearable electronic device may be rigid to support reliable electronic functionality.

In some implementations, any or all of the various embodiment of wearable electronic devices described herein may include one or more marking(s) that indicate the appropriate position and orientation for the device on the user's limb. For example, a marking on muscle interface device 300 may show the top center of the forearm and the direction in which muscle interface device 300 should be worn.

The various embodiments described herein may employ elastic conductors. For example, any or all pod structures, electrical circuitry, electrical couplings, etc. may employ elastic conductors to enhance adaptability and better accommodate the size, form, and/or movements of a user.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 61/857,105; U.S. Provisional Patent Application Ser. No. 61/752,226 (now U.S. Non-Provisional patent application Ser. No. 14/155,087 and U.S. Non-Provisional patent application Ser. No. 14/155,107); U.S. Provisional Patent Application Ser. No. 61/768,322 (now U.S. Non-Provisional patent application Ser. No. 14/186,878 and U.S. Non-Provisional patent application Ser. No. 14/186,889); and U.S. Provisional Patent Application Ser. No. 61/771,500 (now U.S. Non-Provisional patent application Ser. No. 14/194,252), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A closed annular wearable electronic device having a variable circumference, the closed annular wearable electronic device comprising:
   a first pod structure positioned at least approximately on the circumference, wherein the first pod structure includes a first housing formed of a substantially rigid material, the first housing including an inner volume that contains a first electrical circuitry and a first sensor to detect a signal from a user;
   a second pod structure positioned at least approximately on the circumference, wherein the second pod structure includes a second housing formed of a substantially rigid material, the second housing including an inner volume that contains a second electrical circuitry and a second sensor to detect a signal from the user, and wherein the first and the second sensors are physically spaced apart from one another by a circumferential spacing C and by an angular spacing $\theta$;
   at least one continuous, closed annular adaptive coupler that physically couples the first pod structure and the second pod structure, wherein a length of the at least one adaptive coupler is variable and the circumferential spacing C between the first and second sensors is variable, and wherein the angular spacing $\theta$ between the first and the second sensors is at least approximately constant regardless of the length of the at least one adaptive coupler; and
   at least one flexible electrical connection that communicatively couples the first electrical circuitry to the second electrical circuitry, the at least one flexible electrical connection in a folded configuration when the circumferential spacing C is at a minimum and the at least one flexible electrical connection at least partially unfolded from the folded configuration when the circumferential spacing C is greater than the minimum.

2. The closed annular wearable electronic device of claim 1 wherein at least one of the first sensor and the second sensor is selected from a group consisting of: an electromyography sensor; a magnetomyography sensor; a mechanomyography sensor; a blood pressure sensor; a heart rate sensor; an accelerometer; a gyroscope; a compass; and a thermometer.

3. The closed annular wearable electronic device of claim 1 wherein at least one of the first electrical circuitry and the second electrical circuitry include at least one component selected from a group consisting of: an amplification circuit, an analog-to-digital conversion circuit, a battery, a wireless transmitter, and a connector port.

4. The closed annular wearable electronic device of claim 1 wherein the at least one adaptive coupler includes at least one elastic band.

5. The closed annular wearable electronic device of claim 1, further comprising:
   a third pod structure positioned at least approximately on the circumference, wherein the at least one adaptive coupler physically couples the second pod structure and the third pod structure.

6. The closed annular wearable electronic device of claim 5 wherein the third pod structure includes a third housing formed of a substantially rigid material, the third housing including an inner volume that contains a third electrical circuitry and a third sensor to detect a signal from the user, the second and third sensors physically spaced apart from one another by the circumferential spacing C and by the angular spacing θ, and wherein the circumferential spacing C between the second and the third sensors is variable and the angular spacing θ between the second and the third sensors is at least approximately constant regardless of the length of the at least one adaptive coupler.

7. The closed annular wearable electronic device of claim 6 wherein the angular spacing θ between the second and the third sensors is at least approximately equal to the angular spacing θ between the first and the second sensors.

8. The closed annular wearable electronic device of claim 6, further comprising:
   at least one additional pod structure positioned at least approximately on the circumference, wherein each one of the first pod structure, the second pod structure, the third pod structure, and the at least one additional pod structure is positioned adjacent two other ones of the first pod structure, the second pod structure, the third pod structure, and the at least one additional pod structure, and wherein the at least one adaptive coupler provides physical adaptive coupling between each pair of adjacent pod structures and each respective physical adaptive coupling between each pair of adjacent pod structures has a variable length.

9. The closed annular wearable electronic device of claim 8 wherein each additional pod structure includes a respective housing formed of a substantially rigid material, the respective housing including an inner volume that contains a respective electrical circuitry and a respective sensor to detect a signal from the user, the respective sensors in each pair of adjacent pod structures physically spaced apart from one another by the circumferential spacing C and by the angular spacing θ, and wherein the circumferential spacing C between the respective sensors in each pair of adjacent pod structures is variable and the angular spacing θ between the respective sensors in each pair of adjacent pod structures is at least approximately constant regardless of the length of the at least one adaptive coupler providing physical adaptive coupling between each pair of adjacent pod structures.

10. The closed annular wearable electronic device of claim 9 wherein the angular spacing θ between the respective sensors in each pair of adjacent pod structures is at least approximately equal.

11. A wearable electronic device comprising:
   a set of pod structures arranged in a closed annular configuration having a variable continuous circumference, each pod structure in the set of pod structures including a respective housing formed of a substantially rigid material, the respective housing of each pod structure in the set of pod structures including a respective inner volume that contains a respective electrical circuitry and a respective sensor to detect signals from a user, wherein each pod structure in the set of pod structures is positioned adjacent two other pod structures in the set of pod structures at least approximately on the continuous circumference, and wherein the respective sensors of each pair of adjacent pod structures are physically spaced apart from one another in the closed annular configuration by a circumferential spacing C and an angular spacing θ;
   at least one closed continuous annular adaptive coupler that physically couples each pod structure in the set of pod structures to two adjacent pod structures in the set of pod structures and physically binds the set of pod structures in the closed continuous annular configuration, wherein a length of the at least one adaptive coupler is variable and the circumferential spacing C between the respective sensors of each pair of adjacent pod structures is variable, and wherein the angular spacing θ between the respective sensors of each pair of adjacent pod structures is at least approximately constant regardless of the length of the at least one adaptive coupler; and
   a set of flexible electrical connections, wherein each flexible electrical connection communicatively couples a respective pair of two of the electrical circuitries, each flexible electrical connection in a folded configuration when the circumferential spacing C is at a minimum and each flexible electrical connection at least partially unfolded from the folded configuration when the circumferential spacing C is greater than the minimum.

12. The wearable electronic device of claim 11 wherein the circumferential spacing C is at least approximately equal between the respective sensors of each pair of adjacent pod structures.

13. The wearable electronic device of claim 11 wherein the angular spacing θ is at least approximately equal between the respective sensors of each pair of adjacent pod structures, and wherein the angular spacing θ between the respective sensors of each pair of adjacent pod structures is at least approximately constant regardless of the length of the at least one adaptive coupler.

14. The wearable electronic device of claim 11 wherein the set of pod structures includes at least eight pod structures.

15. The wearable electronic device of claim 11 wherein at least one sensor is selected from a group consisting of: an electromyography sensor; a magnetomyography sensor; a mechanomyography sensor; a blood pressure sensor; a heart rate sensor; an accelerometer; a gyroscope; a compass; and a thermometer.

16. The wearable electronic device of claim 11 wherein the electrical circuitry of each pod structure in the set of pod structures includes a component selected from a group consisting of: an amplification circuit, an analog-to-digital conversion circuit, a battery, a wireless transmitter, and a connector port.

17. The wearable electronic device of claim 11 wherein the at least one adaptive coupler includes at least one elastic band.

18. The wearable electronic device of claim 11 wherein the at least one adaptive coupler includes a single adaptive coupler that physically couples between each pair of adjacent pod structures in the set of pod structures.

19. The wearable electronic device of claim 11 wherein the at least one adaptive coupler has a stretching factor in the range of 2 to 3.

20. The wearable electronic device of claim 11 wherein the wearable electronic device has a generally frusto-conical shape.

21. The closed annular wearable electronic device of claim 1 wherein the at least one adaptive coupler has a stretching factor in the range of 2 to 3.

22. The closed annular wearable electronic device of claim 1 wherein the wearable electronic device has a generally frusto-conical shape.

23. The closed annular wearable electronic device of claim 1 wherein the at least one continuous, closed annular adaptive coupler comprises at least two continuous, closed annular adaptive couplers, wherein a respective length of each of the at least two continuous, closed adaptive couplers is variable and the angular spacing θ between the first and the second sensors is at least approximately constant regardless of the lengths of the at least two continuous, closed adaptive couplers.

24. The wearable electronic device of claim 11 wherein the at least one continuous closed annular adaptive coupler comprises at least two continuous closed annular adaptive couplers, wherein a respective length of each of the at least two continuous, closed adaptive couplers are variable and the angular spacing θ between the respective sensors of each pair of adjacent pod structures is at least approximately constant regardless of the lengths of the at least two continuous, closed adaptive couplers.

* * * * *